US007260922B2

(12) United States Patent
Harding et al.

(10) Patent No.: US 7,260,922 B2
(45) Date of Patent: *Aug. 28, 2007

(54) PACKING MATERIAL PRODUCT AND METHOD AND APPARATUS FOR MAKING, MONITORING AND CONTROLLING THE SAME

(75) Inventors: Joseph J. Harding, Mentor, OH (US); Richard O. Ratzel, Westlake, OH (US)

(73) Assignee: Ranpak Corp., Concord Township, OH (US)

( * ) Notice: Subject to any disclaimer, the term of this patent is extended or adjusted under 35 U.S.C. 154(b) by 402 days.

This patent is subject to a terminal disclaimer.

(21) Appl. No.: 10/887,181

(22) Filed: Jul. 7, 2004

(65) Prior Publication Data

US 2004/0259708 A1 Dec. 23, 2004

Related U.S. Application Data

(60) Continuation of application No. 10/353,564, filed on Jan. 29, 2003, now abandoned, which is a division of application No. 09/160,127, filed on Sep. 24, 1998, now Pat. No. 6,524,230, which is a division of application No. 08/943,037, filed on Oct. 2, 1997, now abandoned, which is a continuation-in-part of application No. 08/597,127, filed on Feb. 6, 1996, now Pat. No. 5,864,484, which is a continuation-in-part of application No. 08/482,015, filed on Jun. 7, 1995, now Pat. No. 5,897,478, which is a continuation-in-part of application No. 08/279,149, filed on Jul. 22, 1994, now abandoned.

(51) Int. Cl.
*B65B 1/30* (2006.01)

(52) U.S. Cl. .................. 53/472; 53/64; 53/66; 53/503; 53/504; 493/29; 493/967

(58) Field of Classification Search .................. 53/503, 53/472, 504, 64, 67, 76; 493/29, 30, 404, 493/967, 66
See application file for complete search history.

(56) References Cited

U.S. PATENT DOCUMENTS 1,569,569 A 1/1926 Pels (Continued)

FOREIGN PATENT DOCUMENTS

DE 2741443 3/1979

(Continued)

*Primary Examiner*—Chris Harmon
(74) *Attorney, Agent, or Firm*—Renner, Otto, Boisselle & Sklar, LLP

(57) ABSTRACT

A monitoring system for monitoring one or more packaging material conversion machines includes one or more sensors for monitoring one or more operating characteristics of the one or more conversion machines. The system also includes a controller in communication with the one or more sensors. The controller evaluates the one or more operating characteristics of the one or more conversion machines to thereby provide diagnostic, inventory and machine usage information. In addition, a method of monitoring one or more packaging material conversion machines includes sensing an operating characteristic of the one or more conversion machines and evaluating the operating characteristic of the one or more conversion machines. The sensed operating characteristics may be evaluated either local to the conversion machines or at a remote site, thereby providing a substantial amount of flexibility.

3 Claims, 20 Drawing Sheets

U.S. PATENT DOCUMENTS

| | | | |
|---|---|---|---|
| 2,101,170 A | 12/1937 | Engel | |
| 2,882,802 A | 4/1959 | Walker | |
| 2,924,154 A | 2/1960 | Russel et al. | |
| 3,074,543 A | 1/1963 | Stanley | |
| 3,238,852 A | 3/1966 | Schur et al. | |
| 3,509,797 A * | 5/1970 | Johnson | 493/340 |
| 3,603,216 A | 9/1971 | Johnson | |
| 3,613,522 A | 10/1971 | Johnson | |
| 3,650,877 A | 3/1972 | Johnson | |
| 3,651,465 A | 3/1972 | Law et al. | |
| 3,655,500 A | 4/1972 | Johnson | |
| 3,695,133 A | 10/1972 | Finke | |
| 3,712,139 A * | 1/1973 | Harvey | 73/428 |
| 3,743,140 A | 7/1973 | Sauerbrey | |
| 3,799,039 A | 3/1974 | Johnson | |
| 3,899,166 A | 8/1975 | Behn | |
| 3,949,856 A | 4/1976 | Ulber et al. | |
| 4,026,198 A | 5/1977 | Ottaviano | |
| 4,061,326 A | 12/1977 | Proudman | |
| 4,071,911 A | 1/1978 | Mazur | |
| 4,085,662 A | 4/1978 | Ottaviano | |
| 4,109,040 A | 8/1978 | Ottaviano | |
| 4,174,237 A | 11/1979 | Hemming, Jr. et al. | |
| 4,237,776 A | 12/1980 | Ottaviano | |
| 4,247,289 A | 1/1981 | McCabe | |
| 4,449,349 A | 5/1984 | Roth | |
| 4,506,492 A * | 3/1985 | Boyd | 53/473 |
| 4,548,286 A | 10/1985 | Sashiki et al. | |
| 4,557,716 A | 12/1985 | Ottaviano | |
| 4,561,776 A * | 12/1985 | Pryor | 356/72 |
| 4,585,381 A | 4/1986 | Boyse | |
| 4,607,252 A | 8/1986 | Neri | |
| 4,619,635 A | 10/1986 | Ottaviano | |
| 4,650,456 A | 3/1987 | Armington | |
| 4,699,609 A | 10/1987 | Komaransky et al. | |
| 4,705,552 A | 11/1987 | Liska et al. | |
| 4,717,613 A | 1/1988 | Ottaviano | |
| 4,719,449 A | 1/1988 | Cousseau | |
| 4,750,896 A | 6/1988 | Komaransky et al. | |
| 4,781,090 A | 11/1988 | Feldkamper et al. | |
| 4,800,708 A * | 1/1989 | Sperry | 53/449 |
| 4,819,195 A * | 4/1989 | Bell et al. | 702/95 |
| 4,884,999 A | 12/1989 | Baldacci | |
| 4,922,687 A | 5/1990 | Chow et al. | |
| 4,924,506 A | 5/1990 | Crossley et al. | |
| 4,968,291 A | 11/1990 | Baldacci et al. | |
| 4,997,091 A | 3/1991 | McCrea | |
| 5,008,842 A | 4/1991 | Nagai et al. | |
| 5,016,182 A | 5/1991 | Bergland et al. | |
| 5,062,052 A | 10/1991 | Sparer et al. | |
| 5,088,370 A | 2/1992 | Kondo | |
| 5,088,972 A | 2/1992 | Parker | |
| 5,109,347 A | 4/1992 | Quick, Jr. et al. | |
| 5,123,889 A | 6/1992 | Armington et al. | |
| 5,136,222 A | 8/1992 | Yamamoto et al. | |
| 5,173,352 A | 12/1992 | Parker | |
| 5,180,157 A | 1/1993 | Helit et al. | |
| 5,188,581 A | 2/1993 | Baldacci | |
| 5,194,720 A | 3/1993 | Reinnagel et al. | |
| 5,211,620 A | 5/1993 | Ratzel et al. | |
| 5,213,867 A | 5/1993 | Huston, Sr. et al. | |
| 5,252,899 A | 10/1993 | Kawamura et al. | |
| 5,303,585 A | 4/1994 | Lichte | |
| 5,322,477 A | 6/1994 | Armington et al. | |
| 5,387,173 A | 2/1995 | Simmons, Jr. | |
| 5,403,259 A | 4/1995 | Parker | |
| 5,418,713 A | 5/1995 | Allen | |
| 5,439,730 A | 8/1995 | Kelly et al. | |
| 5,460,209 A | 10/1995 | Jandura et al. | |
| 5,468,208 A | 11/1995 | Armington et al. | |
| 5,483,052 A | 1/1996 | Smith, III et al. | |
| 5,504,779 A | 4/1996 | Moldovansky et al. | |
| 5,517,404 A | 5/1996 | Biber et al. | |
| 5,566,529 A * | 10/1996 | Sireix | 53/412 |
| 5,571,067 A | 11/1996 | Ratzel | |
| 5,612,905 A | 3/1997 | Maillart et al. | |
| 5,655,009 A | 8/1997 | Arai et al. | |
| 5,720,154 A | 2/1998 | Lasher et al. | |
| 5,794,416 A | 8/1998 | Rahman | |
| 5,829,231 A | 11/1998 | Harding et al. | |
| 5,864,484 A | 1/1999 | Harding | |
| 5,871,429 A | 2/1999 | Harding | |
| 6,095,803 A | 8/2000 | Slater | |
| 6,182,666 B1 | 2/2001 | Dobak | |

FOREIGN PATENT DOCUMENTS

| | | |
|---|---|---|
| DE | 3315520 | 11/1983 |
| DE | 0274188 | 12/1989 |
| EP | 044565 | 7/1981 |
| WO | WO95/13914 | 5/1995 |

* cited by examiner

PACKING MATERIAL PRODUCT AND METHOD AND APPARATUS FOR MAKING, MONITORING AND CONTROLLING THE SAME

RELATED APPLICATIONS

This is a continuation of U.S. patent application Ser. No. 10/353,564, filed Jan. 29, 2003, now abandoned, which is a divisional of U.S. patent application Ser. No. 09/160,127, filed Sep. 24, 1998, now U.S. Pat. No. 6,524,230, which is a divisional of U.S. patent application Ser. No. 08/943,037, filed Oct. 2, 1997, now abandoned, which is a continuation-in-part of U.S. patent application Ser. No. 08/597,127, filed Feb. 6, 1996, now U.S. Pat. No. 5,864,484, which is a continuation-in-part of U.S. patent application Ser. No. 08/482,015, filed Jun. 7, 1995, now U.S. Pat. No. 5,897,478, which is a continuation-in-part of U.S. patent application Ser. No. 08/279,149, filed Jul. 22, 1994, now abandoned, each of which is incorporated herein by this reference.

FIELD OF THE INVENTION

The present invention relates to a resilient packing material or the like and to the method and apparatus for making the same. More particularly, this invention relates to an apparatus and method having a controller which can be used to monitor a number of different machines and to record and perform machine diagnostics.

BACKGROUND OF THE INVENTION

Styrofoam pellets or peanuts are commonly used within the wholesale and retail industries as bulk packaging material. The peanuts are used to position a product away from the interior sides of a container and fill the empty space located therebetween. The peanuts are intended to protect the packaged product against the impact of a blow or other mistreatment.

Dispensing styrofoam peanuts does not require a great degree of sophistication. The peanuts are simply gravity fed from large retainer bins into the empty spaces within a packaging container. Use of styrofoam peanuts, however, has many drawbacks. For example, if styrofoam peanuts are used to protect a heavy object placed within a container, and such package is jostled or shaken, the object usually gravitates toward the bottom of the container and the peanuts float upward. Eventually the object comes to rest against the base or side of the container and damage to the object may occur. The light weight of the styrofoam peanuts also allows them to be easily blown by the wind and scattered. The styrofoam peanuts also create static electricity, causing the peanuts to cling to the protected articles after the articles are removed from their containers. Further, the peanuts may create an electrostatic discharge (ESD) which can cause damage to sensitive electronic components.

Of particular concern, styrofoam peanuts are extemely difficult to dispose of and destroy after use. In fact, because of the extensive use of this nonbiodegradable product, which emits toxic gases if burned, styrofoam peanuts present a major threat to the environment and are being banned from an increasing number of communities. Styrofoam peanuts are also dangerous to children and to wildlife who often mistake them as food and consequently ingest them. Styrofoam peanuts are not digestible and are a major source of tracheal blockage in children.

Other packaging filler materials, such as shredded paper, have also been used. Shredded paper, however, usually lays flat within the container and a large amount of paper is required to provide the bulk needed to fill the voids and to protect the contained object. To provide such a large amount of shredded paper is often cost prohibitive and, following its use, such voluminous amounts of paper must be disposed. In addition, the shock absorbency of flat, shredded paper is minimal.

U.S. Pat. No. 5,403,259, which is hereby incorporated by reference, is directed toward an apparatus and method for rapidly producing large quantities of bulk packaging material comprising folded and crimped, interlocking strips of sheet material which may be used as resilient padding to cushion and prevent heavier objects from gravitating toward the bottom or sides of a container. The apparatus and method provides for the production of selectable lengths, the smaller lengths capable of being gravity fed into containers to fill voids and larger lengths capable of being wrapped around a product to provide a secure, protective cushion. The method and apparatus is also operable to produce such folded and crimped, interlocking strips of sheet material in selectable colors and/or controlled color combinations for decorative and aesthetic purposes. Furthermore the apparatus and method allows for the manufacture of such strips from biodegradable material, such as pulp material (i.e., paper, cardboard, or the like).

Due to the increased popularity of paper protective packaging material, additional, automated control mechanisms to operate and/or monitor such packaging material construction, would be desirable. Consequently, it would be desirable to provide a single controller which could monitor a variety of machine types without substantial adjustments or modifications to the controller. It would also be desirable for a controller to collect and to store diagnostic information and to perform enhanced and automated packaging functions.

SUMMARY OF THE INVENTION

The present invention provides a packing product and method and apparatus for making the same having a monitoring system including a controller suitable for use in monitoring and providing diagnostics for one or more conversion machines with little or no change required of the controller. The controller associated with the one or more conversion machines communicates with various sensors and measuring devices to greatly increase the information available to a user or technician either local to or remote from the one or more conversion machines for recording machine and stock material usage and aiding in diagnostic evaluation and other functions.

The controller monitors one or more operating characteristics of the one or more conversion machines. Exemplary operating characteristics include inventory data relating to a roll of sheet material being used, data relating to a treatment of the sheet material, a color of the sheet material being used and a quantity of sheet material that has been converted. Additional, exemplary operating characteristics that may be monitored by the monitoring system include a performance quality of a shredding device, a status of the shredding device, a temperature of one or more portions of the conversion machine, a pressure exerted within a restricting region, a shear force exerted by a transverse cutting element and container data for dispensing of a converted product from the conversion machine into a container.

According to one aspect of the present invention, a cushioning conversion machine having a controller for monitoring the cushioning conversion machine is disclosed. The controller is suitable for use in a variety of different configurations of the cushioning conversion machine with little or no change required of the controller. The controller includes a number of output ports for controlling the function of the cushioning conversion machine regardless of the cutting assembly employed or the operation mode selected for the controller. The cushioning conversion machine preferably includes a controller which communicates with various sensors and measuring devices to greatly increase the information available to the controller for recording and aiding in diagnostic and other functions.

In accordance with another aspect of the present invention, an apparatus and method for rapidly producing and monitoring large quantities of bulk packaging material comprising folded and crimped, interlocking strips of sheet material is disclosed. In this particular embodiment of the present invention, sheet material is cut into a plurality of longitudinal strips. The advancement of the strips is restricted to cause the strips to fold against themselves in a relatively controlled manner, thereby repetitively folding, crimping or creasing each strip. The monitoring system of the present invention is operable to monitor one or more of the operating characteristics of the apparatus and method and provide diagnostic information to a user either local to or remote from manufacturing site.

The monitoring system, via the controller, is operable to monitor each of the above discussed features of one or more conversion machines as well as other conversion machine operating characteristics. For example, the controller is operable to monitor the pressure exerted by the accumulated body of strips to ensure that the shredding device does not become jammed. In addition, the controller monitors the status of the shredding blades to ensure that the blades are properly aligned and maintained. Further, the controller may monitor the shearing force exerted by a shearing device used to cut the elongated strips into strip segments, (if employed). Further still, the controller is operable to monitor the amount of total paper and/or the various amounts of different colored paper used for inventory control and/or marketing purposes. Lastly, the controller is operable to monitor the timing of machine operation and the stability or vibrational modes of the conversion machine to ensure that any wear or failure mechanisms are pro-actively addressed before a machine failure occurs. The controller is operable to monitor one or more of the above conversion machine characteristics and provide visual and/or audible indications of such characteristics via a display.

The controller may be utilized local to one or more conversion machines by a user or alternatively they may be monitored remotely via a data communication port and a communication apparatus such as a modem. With remote monitoring, multiple conversion machines at various locations can be easily and efficiently monitored.

To the accomplishment of the foregoing and related ends, the invention comprises the features hereinafter fully described and particularly pointed out in the claims. The following description and the annexed drawings set forth in detail certain illustrative embodiments of the invention. Theses embodiments are indicative, however, of but a few of the various ways in which the principles of the invention may be employed. Other objects, advantages and novel features of the invention will become apparent from the following detailed description of the invention when considered in conjunction with the drawings.

DETAILED DESCRIPTION OF THE INVENTION

The present invention provides a packing product and method and apparatus for making the same having a monitoring system including a controller suitable for use in monitoring and providing diagnostics for one or more conversion machines with little or no change required of the controller. The controller associated with the one or more conversion machines also communicates with various sensors and measuring devices to greatly increase the information available to a user or technician either local to or remote from the one or more conversion machines for recording machine and stock material usage and aiding in diagnostic evaluation and other functions.

The controller monitors one or more operating characteristics of the one or more conversion machines. Exemplary operating characteristics include inventory data relating to a roll of sheet material being used, data relating to a treatment of the sheet material, a color of the sheet material being used and a quantity of sheet material that has been converted. Additional, exemplary operating characteristics that may be monitored by the monitoring system include a performance quality of a shredding device, a status of the shredding device, a temperature of one or more portions of the conversion machine, a pressure exerted within a restricting region, a shear force exerted by a transverse cutting element and container data for dispensing of a converted product from the conversion machine into a container. Further, the controller may store machine information such as a serial number, software revision number and date, physical site location, customer data and a conversion machine number or identifier. Other, additional information, as needed or desired, may also be evaluated, monitored and/or stored.

Figure 1:
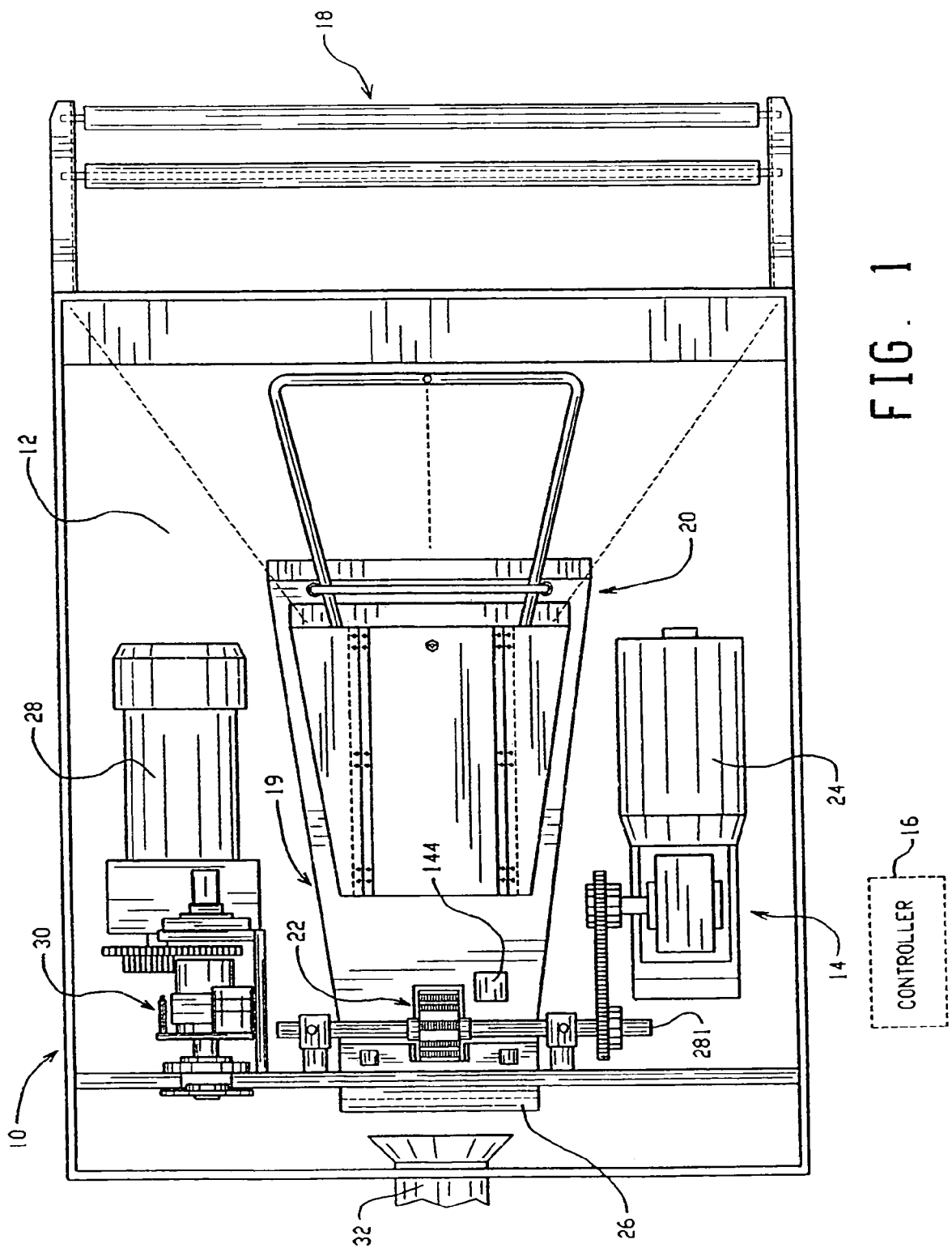
FIG. 1 is an illustration of a cushioning conversion machine.

The present invention is applicable to many types of packaging material conversion machines. For example, with reference to the drawings and initially to FIG. 1, there is shown a cushioning conversion machine 10 including a frame 12 upon which the various components of a conversion assembly 14 are mounted and a controller 16 (illustrated schematically) for controlling the machine including the components of the cushioning assembly. The frame 12 includes a stock supply assembly 18 which holds a roll of stock for conversion by the conversion assembly 14 into a cushioning material. The conversion assembly 14 preferably includes a feed assembly 19 which includes a forming assembly 20 and a gear assembly 22 powered by a feed motor 24, a cutting assembly 26 powered by, for example, a cut motor 28 selectively engaged with the cutting assembly by an AC solenoid driven clutch 30 and a post cutting constraining assembly 32.

During the conversion process, the forming assembly 20 causes the lateral edges of the stock material to roll inwardly to form a continuous strip having two lateral pillow-like portions and a central band therebetween. The gear assembly 22 performs a "pulling" function by drawing the continuous strip through the nip of two cooperating and opposed gears of the gear assembly thereby drawing stock material through the forming assembly 20 for a duration determined by the length of time that the feed motor 24 rotates the opposed gears. The gear assembly 22 additionally performs a "coining" or "connecting" function as the two opposed gears coin the central band of the continuous strip as it passes therethrough to form a coined strip. As the coined strip travels downstream from the gear assembly 22, the cutting assembly 26 cuts the strip into sections of a desired length. These cut sections then travel through the post-cutting constraining assembly 32.

The controller 16 is preferably "universal" or capable of use in a number of differently configured cushioning conversion machines without requiring substantial change to the controller. Accordingly, one configuration of a universal controller 16 can thus be manufactured for a variety of different cushioning conversion machines. The assembly technician then need not adapt the controller 16 to a specific configuration of the cushioning machine, such as when one of the particular cushioning machines is adapted to use an air powered cutting assembly, a direct current powered solenoid cutting assembly, or a motor driven cutting assembly. The capability of the universal controller to control differently configured machines reduces assembly time, reduces assembly cost since the labor cost in specifically configuring a controller often outweighs the cost of assembling unused electrical components in the controller and reduces the possibility of assembly error. Moreover, repair of the machine is facilitated since training of the repair technician is minimized and since an inventory of universal controllers for use in a variety of cushioning machines can be maintained.

Figure 2:
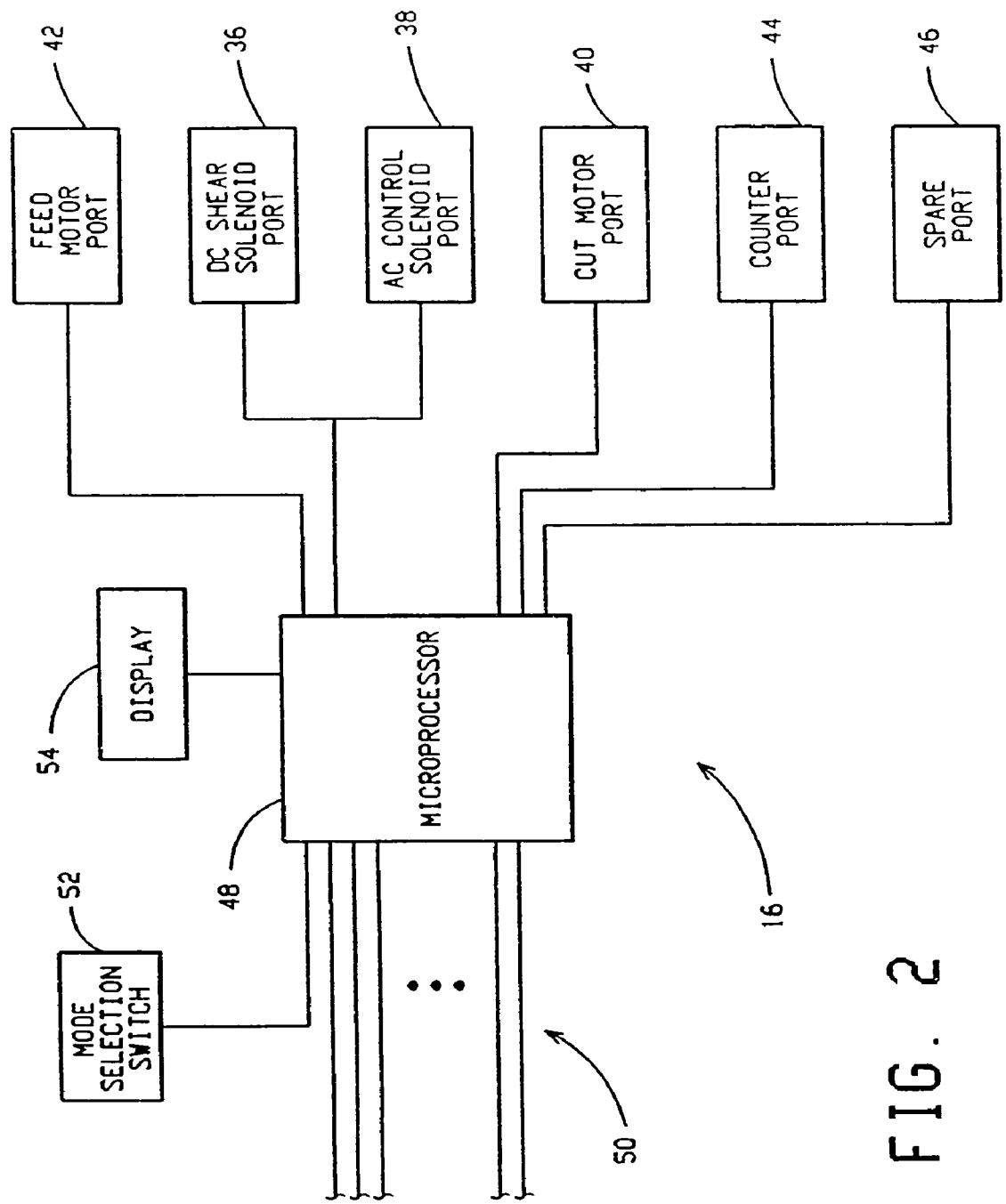
FIG. 2 is a block diagram of a universal controller for a cushioning conversion machine.

An exemplary universal controller 16 is illustrated in FIG. 2 and includes a number of different output ports 36, 38, 40, 42, 44 and 46 devoted to providing a control signal from a microprocessor 48 to a DC shear solenoid, an AC control solenoid, a cut motor, a feed motor, a counter and a spare port, respectively, in accordance with a number of inputs 50. While the microprocessor 48 is illustrated and described herein as a single device, it is noted that microprocessor 48 may be embodied as a number of microprocessors or control units of the same type or as different microprocessors adapted for performing certain functions. The DC shear solenoid, controlled by the microprocessor 48 through DC shear solenoid port 36, powers a cutting blade positioned at the output of a cushioning conversion machine. When the DC shear solenoid is provided power by a control signal sent through the port 36, the solenoid actuates a cutting blade to force the blade through the dunnage to make a cut. One machine employing a cutting assembly powered by a DC solenoid is marketed by Ranpak Corp. under the name PadPak® and is disclosed in U.S. Pat. No. 4,968,291 which is incorporated herein by this reference.

The AC control solenoid port 38 controls an external AC solenoid which is typically used in conjunction with either an air-powered cutting assembly or a motor powered cutting assembly. When a cushioning conversion machine including the universal controller 16 employs an air-powered cutting assembly, the cutting assembly uses the AC solenoid to control the supply of pressurized air to an air cylinder which drives a cutting blade to shear off a section of dunnage fed through the machine. A cushioning conversion machine employing an air-powered cutting assembly is marketed under the name PadPak® by Ranpak Corp. and disclosed in U.S. Pat. No. 4,968,291 which has been incorporated herein above. The AC control solenoid port 38 may also be used to control an AC solenoid which acts to couple the direct drive cut motor 28 to the cutting assembly 26 via the clutch 30 to drive a cutting blade through a cutting stroke to cut a section of dunnage material fed through the machine. One such machine is marketed by Ranpak Corp. under the name AutoPad® and is disclosed in U.S. Pat. No. 5,123,889 which is also incorporated herein by this reference. In this embodiment of a cushioning conversion machine, the cut motor port 40 is used to supply a signal to the cut motor 28 to ensure that the cut motor is running when a cut is desired.

In any of the embodiments of a cushioning conversion machine described above, there is employed some means for moving the paper material through the machine to create the dunnage material. The PadPak® and AutoPad® machines referenced above employ the feed motor 24 which turns the enmeshed gears 22 that grip the paper stock and feed it through the machine where the appropriate conversion of the sheet-like stock to a dunnage product and the cutting of the dunnage product into appropriate lengths takes place. The universal controller 16 controls the feed motor 24 through the feed motor port 42. When it is desired that an appropriate length of paper be fed through the cushioning conversion machine by the feed motor 24, the microprocessor 48 sends a signal through the feed motor port 42 which causes power to be supplied to the feed motor for as long as the signal is present. When the microprocessor 48 has determined that the desired length of paper stock has been fed through the machine 10, the signal is disabled causing the feed motor 24 to stop and the supply of paper through the machine to stop. At this time the microprocessor 48 will determine, based on the position of the mode selection switch 52 and the condition of the input signals 50, whether to initiate a cut of the dunnage material fed through the machine 10, as is described more fully below.

Depending upon the embodiment of the cushioning conversion machine 10, the universal controller 16 may also use the counter port 44 to control a counter which keeps track of the machine usage or a spare port 46 which can be used to provide command signals to some other device.

While the universal controller 16 includes the output ports 36 through 46 for the control of the feed motor 24 and a variety of cutting assemblies, in most applications less than all of the ports will be used. For example, when the universal controller 16 is used to control a cushioning conversion machine having a DC shear solenoid powered cutting assembly, such as the PadPak® machine mentioned above, the DC shear solenoid port 36 is used while the AC control solenoid port 40 and the cut motor port 16 will not be used. When the universal controller 16 is used to control a machine 10 having an air powered cutting assembly, the AC control port 38 is employed to control the AC control solenoid, and the DC shear solenoid port 36 and the cut motor port 40 may be unused. Similarly, when the universal controller 16 is used in conjunction with a cushioning conversion machine using the cut motor 28 to actuate the cutting assembly 26, such as the AutoPad® machine mentioned above, the AC control solenoid port 38 and cut motor port 40 will be used to control and power the cutting assembly 26 while the DC shear solenoid port 36 will be unused. Preferably, the microprocessor 48 will more or less simultaneously cause appropriate signals to be sent to each of the respective output ports 36, 38, 40 regardless of the actual cutting assembly employed with a machine. In this way the microprocessor 48 does not need to be informed of this aspect of the configuration of the machine and the cutting assembly 26 connected to a port will thus be the one that responds to a signal sent from the microprocessor without the microprocessor having to distinguish which type of cutting assembly is employed.

Control of the various devices, such as the DC shear solenoid and the cut and feed motors, is performed by the microprocessor 48 in accordance with certain inputs 50 which are indicative of the operating condition of the cushioning conversion machine 10 and certain events which may have been sensed. The inputs 50 also include an indication of the operating mode for the cushioning conversion machine selected through the mode selection switch 52, such as a rotary switch. The mode selection switch 52 includes a number of settings corresponding to different operating modes, for example, keypad mode, electronic dispensing system mode, automatic cut mode, feed cut foot switch mode, and automatic feed mode. The mode setting of the controller 16 as well as a number of error signals may be displayed as alphanumeric codes on the display 54. For example, a display code of '1' may indicate to an operator that the machine 10 is operating in the automatic feed mode, while a display of "A" may indicate that an error has occurred in the buttons used to manually command a cut.

The keypad mode is for cushioning conversion machines which are equipped with a keypad through which an operator may input the length of each pad which she desires the machine to produce by depressing the appropriate key on the keypad. In this mode, regardless of the cutting assembly employed, the microprocessor 48 provides a signal to the feed motor through the feed motor port 42 to feed material through the machine for the appropriate length of time to provide dunnage of the length which the operator selected through the keypad. The keypad buttons are preferably pre-programmed so that each button corresponds to a particular cut length. For example, if an operator pushes button 12 on the keypad, and this button was preprogrammed to correspond to a length of 12 inches, the microprocessor 48 will signal the feed motor 24 and turn the feed motor on for a length of time that equates to 12 inches of dunnage material being fed out, and then the microprocessor will disable the feed motor. Upon completion of the dunnage material of the selected length being fed through the machine, the microprocessor 48 automatically commands the cutting assembly 26 employed, through the output ports 36, 38, and 40, to perform a cut. The microprocessor 48 then waits for the next key on the keypad to be depressed and repeats the process to produce a length of dunnage corresponding to the key depressed.

When the electronic dispensing system (EDS) mode setting is selected on the mode selection switch 52, an external electronic dispensing sensor is employed to detect the presence or absence of a dispensed length of dunnage material. The information as to the presence or absence of dunnage material is provided to the microprocessor 48 through one of the inputs 50. If the sensor detects that there is no dunnage material left at the cutting area of the machine, this information is passed to the microprocessor 48 which will send a signal to the feed motor 24 through the feed motor port 42 to feed out a certain length of material. The length of material to be fed through the machine 10 is determined by the setting of a thumb wheel, which is described below, as reported to the microprocessor 48 over one of the inputs 50. Once material is fed through the machine 10 and emerges at the cutting exit, the electronic dispensing sensor will report to the microprocessor 48 the presence of the dunnage material at the cutting exit of the machine. After the complete length of material has been fed through the machine 10 by the feed motor 24, the microprocessor 48 will wait a short period of time to allow the feed motor to stop and will then send a signal over the necessary output ports to command a cut to be performed by the attached cutting assembly 26. The electronic dispensing assembly will continue to report to the microprocessor 48 the presence of the dunnage material at the exit of the machine until the material is removed. Upon removal of the material, the sensor will report the removal to the microprocessor 48 through the inputs 50 whereupon the microprocessor will send a signal to the feed motor 24 again to feed another length of dunnage material through the machine and once the feed is complete the microprocessor will send a signal over the required output ports to cause the cutting assembly 26 to cut the material. This process will continue as long as the operator continues to remove the cut dunnage from the exit area of the machine.

The automatic cut mode selection on the selector switch 52 causes the microprocessor 48 to perform basically the same process set forth above for the EDS mode with the exception that an operator need not remove a length of dunnage material from the machine in order for the next length to be fed through the machine and cut. In this mode the microprocessor 48 commands the feed motor 24 through the feed motor port 42 to feed material through the machine for a length of time determined by the setting of the thumb wheel. Once the desired length of material has been fed through the machine, the microprocessor 48 will disable to signal to the feed motor 24, will wait a short period of time to allow the feed motor to stop and then will send the appropriate signals to the output ports 36, 38, 40 controlling the respective cut assemblies 26. The microprocessor 48 will cause predetermined lengths of material to be fed and cut by the machine continuously in this mode unless a predetermined number of lengths has been selected by the operator.

When the feed cut foot switch mode is selected on the mode selection switch 52, the control of the machine by the microprocessor 48 will be as instructed by an operator actuated foot switch. When an operator depresses the foot switch, an input indicating the fact is sent to the microprocessor 48 through one of the inputs 50. In response, the microprocessor 48 will send a signal to the feed motor 24 through the feed motor port 42 to feed material through the machine. The signal sent to the feed motor 24 by the microprocessor 48 will continue until the operator lets the pressure off of the foot switch at which time the microprocessor will disable the signal to the feed motor, will wait a short period of time to allow the feed motor to stop and then will send a signal to the output ports 36, 38, 40 operating the cutting assemblies 26 to cut the material fed through the machine.

The fifth mode of the mode selection switch 52 is the auto feed mode. In the auto feed mode the microprocessor 48 signals the feed motor 24 through the feed motor port 42 to feed a length of paper through the machine as determined by the position of the thumb wheel. After the appropriate length of dunnage material has been fed through the machine, the microprocessor will pause until a cut is manually requested. In this mode the operator must then instruct the microprocessor to signal the cut assembly to perform a cut. The operator preferably causes a cut to occur by manually depressing two cut buttons simultaneously. When the buttons have been depressed, both inputs are sent to the microprocessor 48 over the input lines 50 and, provided the buttons have been pushed near simultaneously, the microprocessor will send a signal through the appropriate outputs to the cutting assembly 26 employed on the machine to cut the material. After a cut has been completed, the microprocessor 48 will again send a signal to the feed motor 24 to cause the selected length of material to be fed through the machine and will then wait for the operator to instruct that a cut be made.

Figure 3:
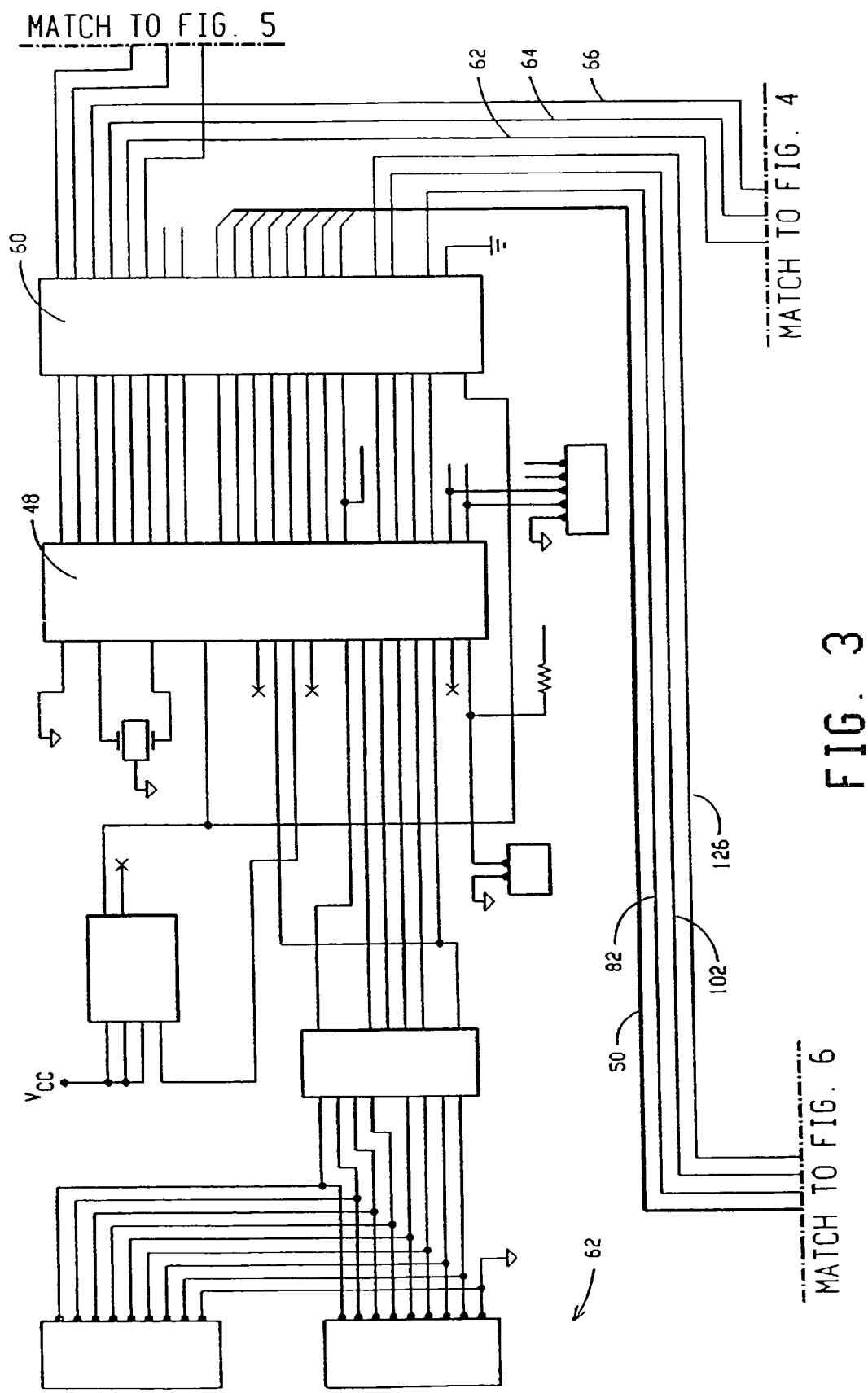
FIGS. 3 through 8 are electrical schematic diagrams of an embodiment of the universal controller.
Figure 4:
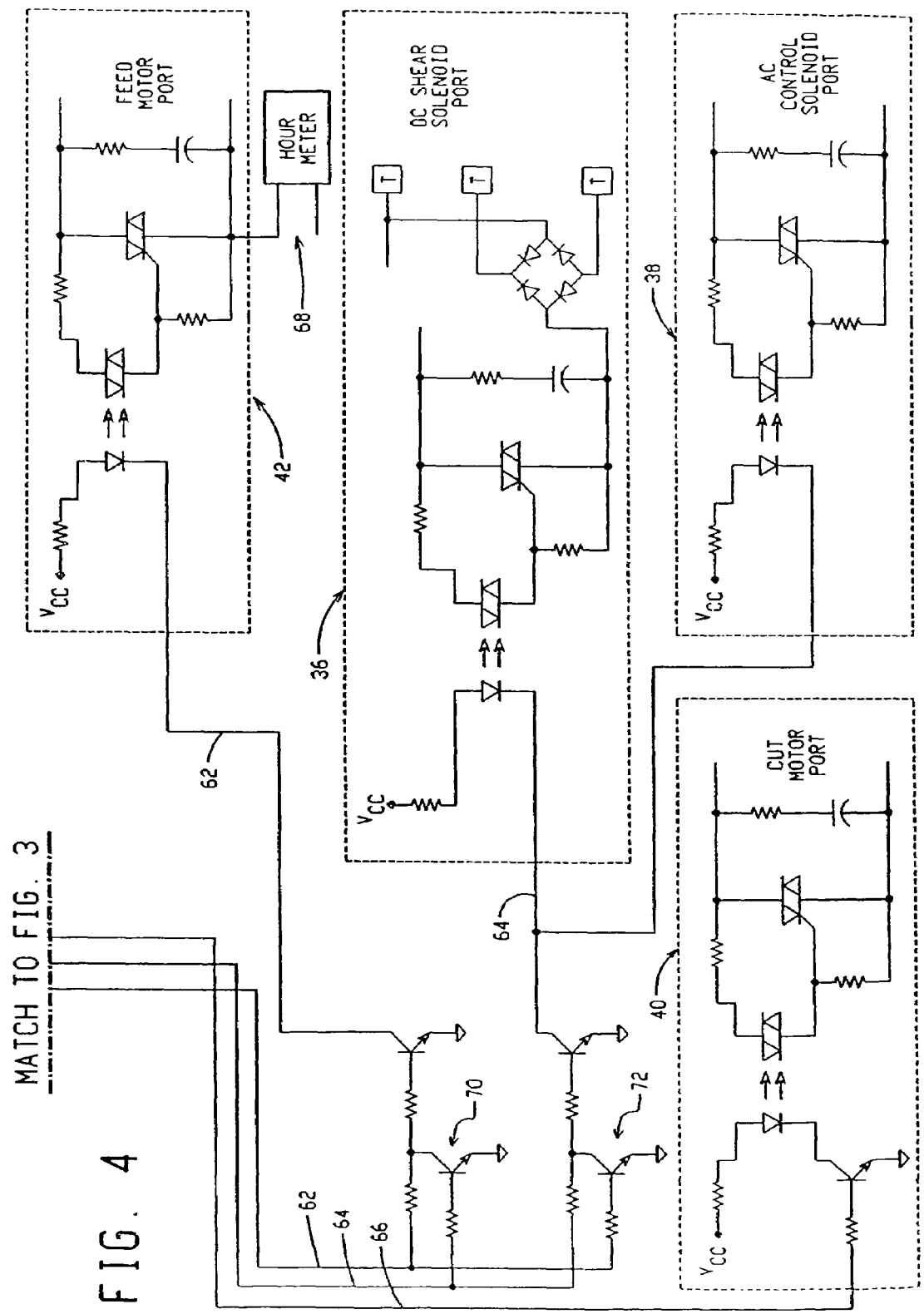
Figure 5:
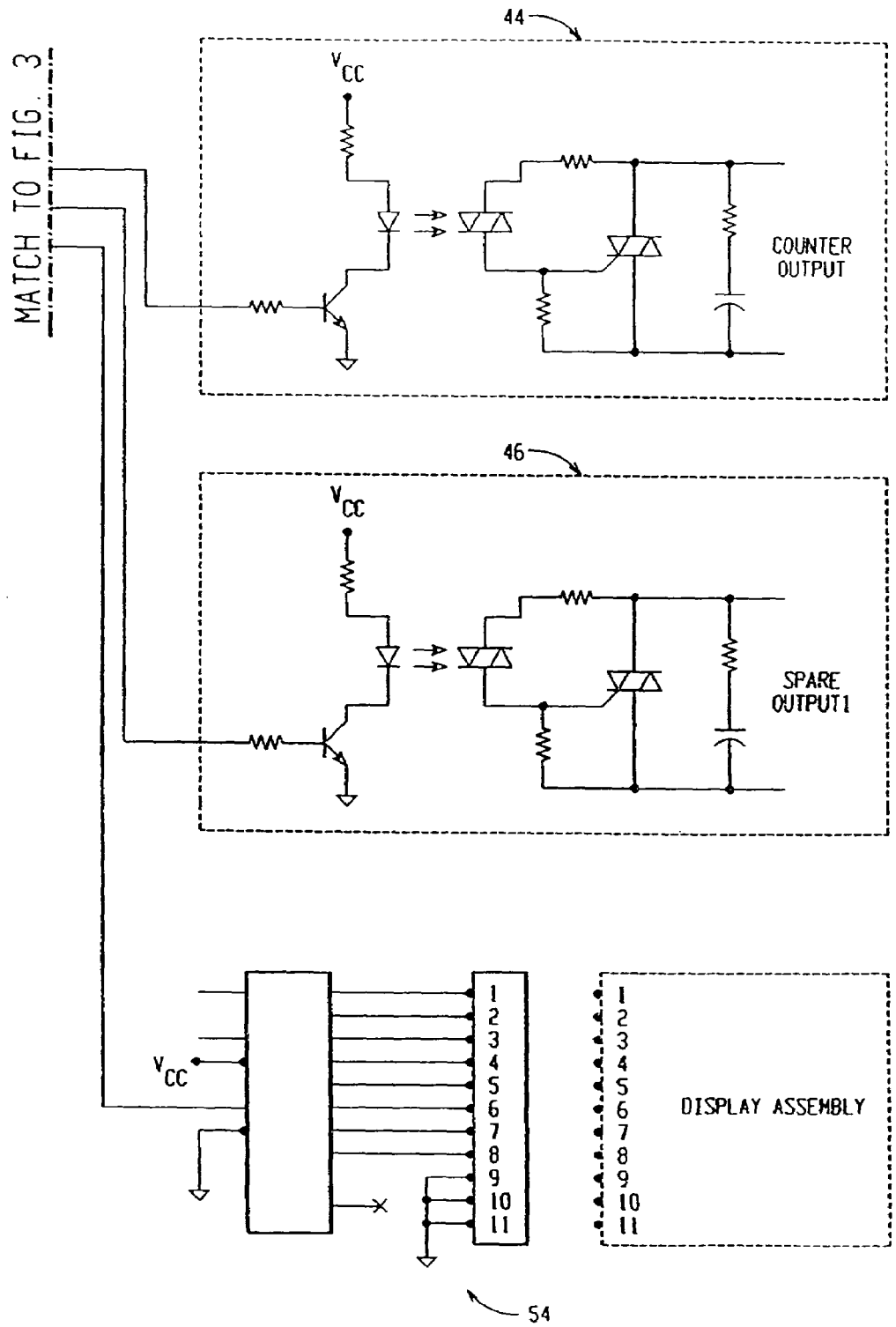

An embodiment of the universal controller 16 described above is shown in the schematic circuit diagram of FIGS. 3 through 8. Turning first to FIGS. 3 through 5, the interaction between the microprocessor 48 and output ports 36 through 46 is shown. The microprocessor 48 may be any one of a number of commercially available general purpose processing chips and preferably one suitable for convenient interface with the output ports 36 through 46 and the inputs 50 through a storage memory 60, such as a programmable peripheral device that may include ROM, RAM and I/O ports. The microprocessor 48 is also provided with keypad inputs 62 to which a keypad may be attached when the universal processor 16 is desired to operate in the keypad mode. To control the various output ports the microprocessor stores the appropriate signal value in a location in the memory 60 accessible to the appropriate output port. For example, to send a signal to the feed motor 24 through the feed motor port 42, the microprocessor 48 will place the desired signal value in a location in the memory 60 accessible by the line 62, to send a signal to the cut motor 28 through the cut motor port 40 the signal value will be placed in a location accessible by the line 66, and to send a signal to the DC shear solenoid through the DC shear solenoid port 36 or to the AC control solenoid through the AC control solenoid port 38 the signal value is placed in a memory location accessible by the line 64. When a control signal is sent to the feed motor port 42 to cause the feed motor 24 to run, an hour meter 68 may also be activated which keeps track of the run time of the cushioning conversion machine. To control the spare output port 46 or the counter port 44 (see FIG. 5), the microprocessor 48 places a signal value in a location in the memory 60 accessible by these ports or devices.

It is noted that since the cushioning conversion machine 10 in which the universal controller 16 is employed will be used with only one cutting assembly 26, the output ports which control a cuffing assembly may be shared by different types of cutting assemblies, for example the AC control solenoid port 38 may control an air powered cutting assembly or the engagement clutch 30 of the cut motor 28 powered cutting assembly 26, or a single control line may control more than one output port as the control line 64 is shown to control both the DC shear solenoid port 38 and the AC control solenoid port 14. Further, while only a single cutting assembly 26 is employed by a machine 10 at a time, more than one control line may be used to control a single cutting assembly or to provide other control over the machine. In the instance where the cushioning conversion machine 10 is employed with a cut motor 28, both the control lines 64 and 66 are used to actuate a cut. The control line 66 instructs the cut motor 28 through the cut motor port 40 to run while the control line 64 instructs the AC control solenoid through the AC control solenoid port 38 to engage the clutch 30 coupling the cut motor 28 and the cutting blade assembly 26. The control lines 62 and 64 are also used cooperatively to ensure that the feed motor 24 is not operating when a cut has been initiated as this may cause the dunnage material to become jammed in the machine. A pair of transistors 70 and 72 are interconnected with the control lines 62 and 64 so that the feed motor 24 and a cutting assembly 26 cannot both be actuated simultaneously as the presence of a signal on one control line disables the other control line.

Figure 6:
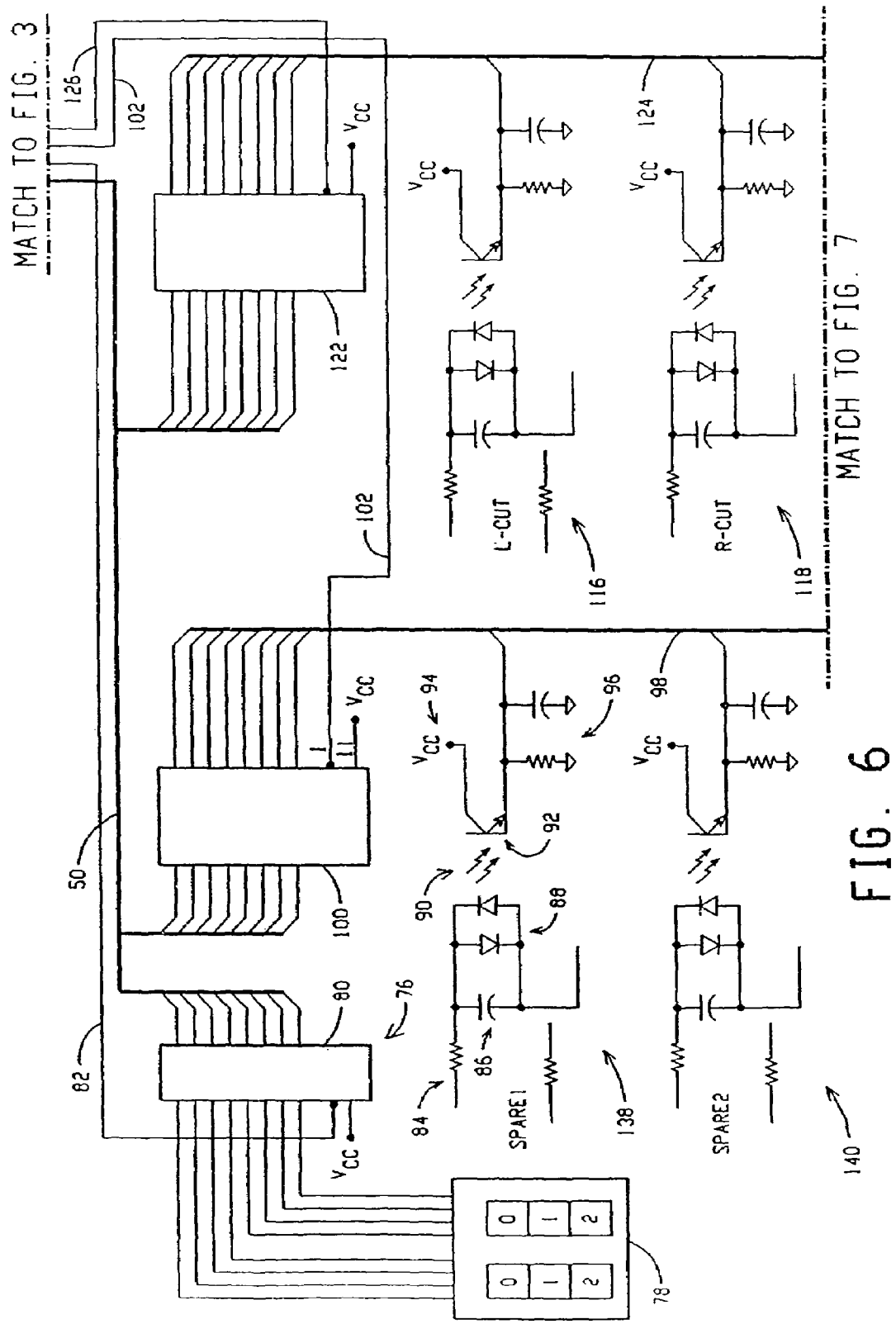
Figure 7:
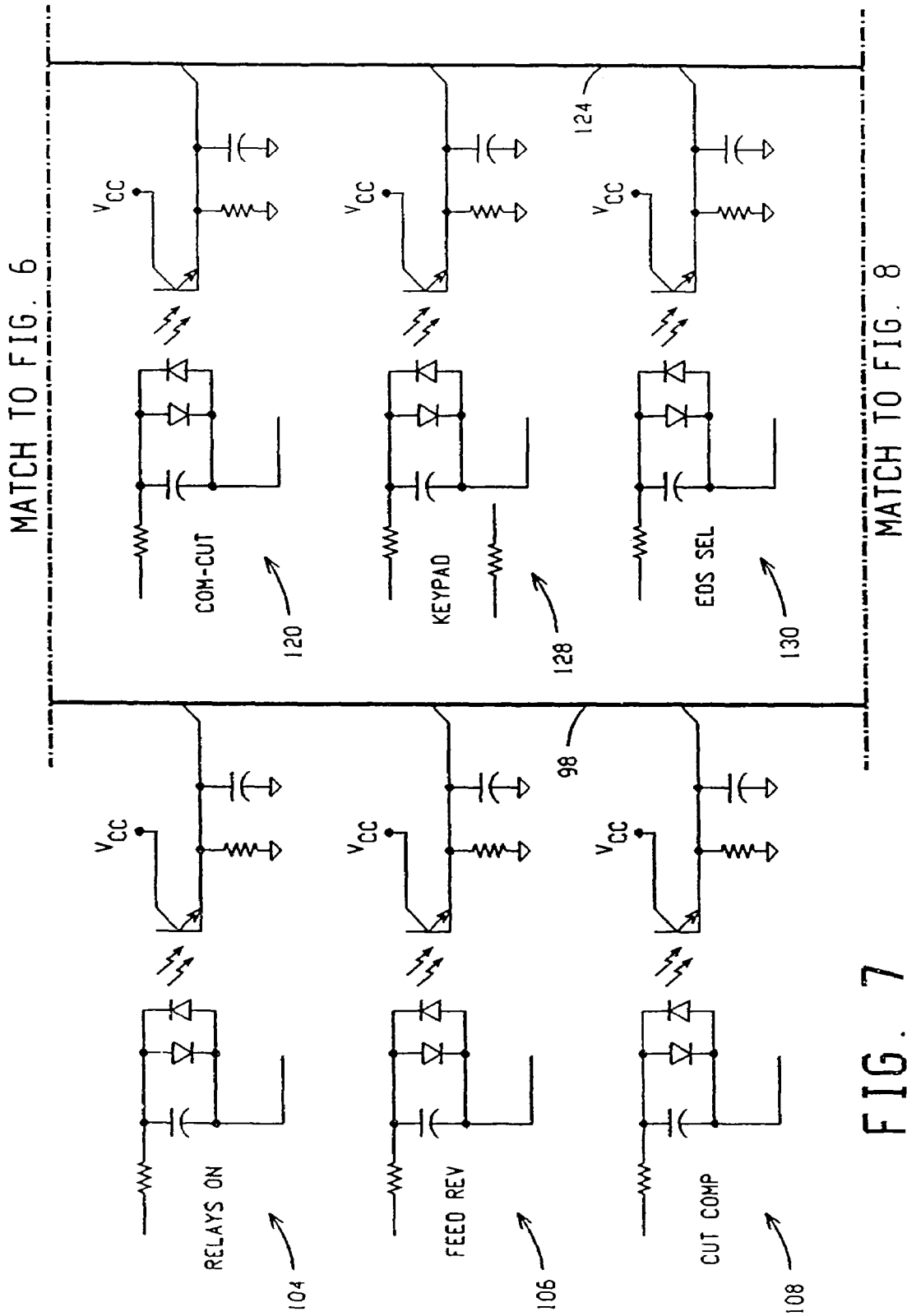
Figure 8:
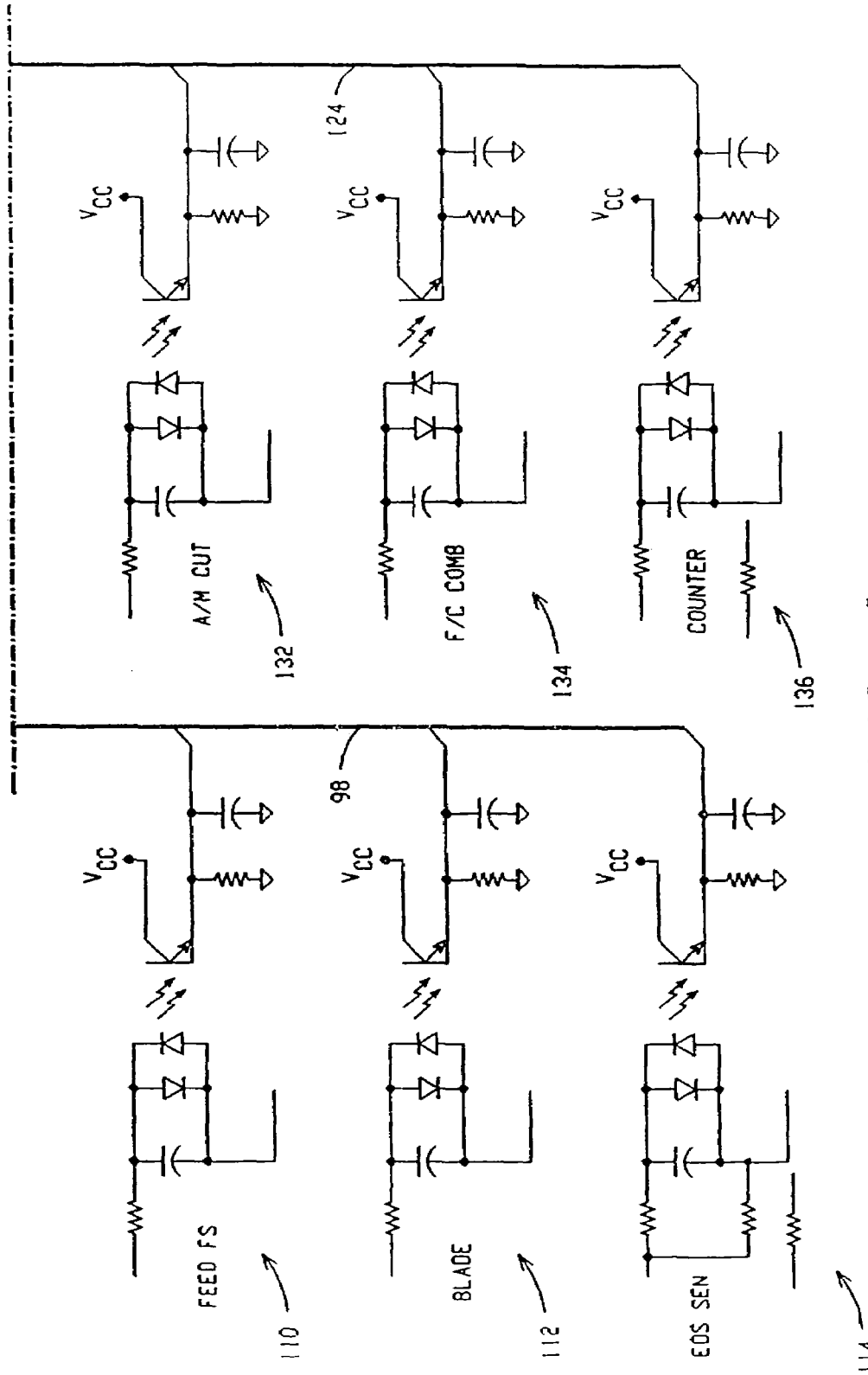

The inputs 50 to the microprocessor 48 are generated through a variety of circuits as shown in FIGS. 6 through 8. FIG. 6 illustrates the thumb wheel circuit 76 discussed above. A two-digit thumb wheel 78 is coupled to the input bus 50 via the bus interface 80 and control line 82 and allows the operator to select the time during which the microprocessor 48 will command the feed motor 24 via control line 62 and feed motor port 42 to run, and thus the length of dunnage material to be fed through the machine, during the EDS mode, automatic cut mode and the automatic feed mode. The selected feed length is sent to the microprocessor 24 over the input bus 50. Shown in FIGS. 6 through 8 are a number of current sensing circuits which provide additional inputs over the input bus 50 that inform the microprocessor 48, through the memory 60, of various operating events of the cushioning conversion machine, e.g. whether a cut has been completed, whether the foot switch is depressed or whether a cut button has been depressed, etc, as well as the selected mode of operation for the universal controller 16.

The current sensing circuits are each of a similar construction but sense unique occurrences. An exemplary current sensing circuit generally includes a contact 84 which receives current when a particular event specific to that sensing circuit occurs. When such an event occurs, current passes through the contact 84 to a capacitor 86 connected in electrical parallel to a pair of diodes 88 of an opto-coupler 90 arranged in reverse parallel. When current is detected across the diodes 88, indicating that the event which the particular sensing circuit is designed to sense, light from the diodes turns on the phototransistor 92 which causes the transistor to couple a constant voltage source 94, filtered by a resistor-capacitor filter 96, to an input 98 to the bus interface 100. The bus interface 100 provides the appropriate input to the memory 60 over the input bus 50 as controlled by control line 102.

Turning then to the specific sensing circuits, the sensing circuit 104 (RELAYS ON) detects whether the cushioning conversion machine has been reset and whether all safety switches are closed indicating that the cover, etc., of the machine is closed. The status of the detection is then sent to the microprocessor 48 via the memory 60 as an input on the input bus 50.

The circuit 106 (FEED REV) senses when an operator has pressed a reverse push button which allows the operator to reverse the rotation direction of the feed motor 24. The purpose of the feed reverse function is to provide a means for clearing a dunnage material jam. Oftentimes, the jammed dunnage can be cleared by simply reversing the feed motor and pulling the dunnage material away from the cutting assembly where jams most often occur. The status of this sensing circuit 106 is also reported to the microprocessor 48 over the input bus 50 through the memory 60.

The circuit 108 (CUT COMP) senses the status of a cut complete switch. Cutting assemblies using a DC solenoid to drive a cutting blade have an attribute of heating up quickly as power is continually applied to the solenoid. When such a solenoid heats up too much, it loses power and cannot cut as effectively as it can when in a cooler state. The cut complete switch detects whether a cut of the dunnage material has been completed. The sensing circuit 108 senses the status of the cut complete switch and reports the status to the microprocessor 48 so that the microprocessor can immediately discontinue the supply of power to the DC shear solenoid by sending an appropriate signal to the DC shear solenoid port 36 over the control line 64.

The position of the foot switch used when the universal controller 16 has been set to the feed cut foot switch mode is sensed by the sensing circuit 110 (FEED FS). The sensing circuit 110 senses the position of the foot switch and reports the position to the microprocessor 48. As discussed above, when in the foot switch mode, if the foot switch is depressed, the microprocessor 48 will signal the feed motor 24 through the feed motor port 42 and control line 62 to continually feed paper through the machine 10 while the foot switch is depressed. Upon the pressure on the foot switch being released, the sensing circuit will report to the microprocessor 48 that the foot switch has been released and the microprocessor will discontinue the signal to the feed motor causing the feed motor to stop and then the microprocessor will send out a signal to the output ports 36, 38 and 40 over the control line 64 and 66 prompting the attached cutting assembly 26 to perform a cut.

The circuit 112 (BLADE) senses the status of a blade switch. The blade switch detects whether the knife blade is in its normal at rest position or if the knife blade is at some other point, such as partially through a cut. If the knife blade is at its rest position, it is safe to feed paper through the machine 10, otherwise if the knife blade was partially through a cut and paper was fed, the paper could feed into the blade and jam the machine. The position of the knife blade as sensed by the circuit 112 is reported to the microprocessor 48 which will disable signals to the feed motor 24 until the circuit 112 has sensed that the knife blade has returned to its rest position.

The circuit 114 (EDS SEN) senses the presence or absence of dunnage material at the cutting assembly 26 area of the cushioning conversion machine 10 and reports the information to the microprocessor 48. When the universal controller 16 is in the EDS mode, the microprocessor 48 will automatically signal the feed motor 24 to feed a length of dunnage material determined by the thumb wheel circuit 76 (FIG. 6) through the machine 10 and signal the attached cutting assembly 26 to cut the material after the appropriate length has been fed whenever the circuit 114 senses that the last length of dunnage material fed has been removed from the exit area.

Continuing the description of the sensing circuits with reference to FIG. 8, the sensing circuits 116 (L-CUT), 118 (R-CUT) and 120 (COM-CUT) correspond to three push buttons located on the cushioning conversion machine 10 which allow for the operator to manually cause the cutting assembly 26 to cut the dunnage material fed through the machine 10. These circuits are recognized by the microprocessor 48 when the universal controller 16 is in the auto feed mode of operation. As a safety measure it is preferable that the microprocessor 48 detect an input from one of the circuits 116, 118 near simultaneously with the detection of an input from the circuit 120 indicating that the COM-CUT button and one of the L-CUT or R-CUT buttons have been pressed near simultaneously before the microprocessor signals the cutting assembly 26 attached to one of the output ports 36, 38 or 40 to perform a cut. The pressing of one of the push buttons by the operator causes the corresponding circuit 116, 118, 120 to provide an input over the input bus to the memory 60 via the bus interface 122, input line 124 and control line 126.

The sensing circuits 128, 130, 132 and 134 sense the position of the mode selection switch 52 and indicate whether the mode selector switch is set to the keypad mode (KEYPAD), the EDS mode (EDS SEL), the automatic cut mode (A/M CUT), or the feed cut foot switch mode (F/C COMB), respectively, and report such information to the microprocessor 48 over the input bus 50 to the memory 60. In the event that the mode selection switch 52 is not set to either the keypad mode, the EDS mode, the automatic cut mode, or the feed cut foot switch mode, the microprocessor 48 will default to operation in accordance with the automatic feed mode described above.

The sensing circuit 136 (COUNTER) senses when a predetermined number of lengths of dunnage material have been generated. When the machine is in the automatic feed mode, the operator sets the counter to the desired number of pads. When this number is reached, a contact closing in the counter is sensed and the circuit 136 informs the microprocessor 48 that the number of dunnage lengths has been reached and the microprocessor disables the automatic feed operation.

A number of spare sensing circuits 138 (SPARE1), 140 (SPARE2) as seen in) FIG. 7, are also provided to enable the microprocessor 48 to perform expanded control functions based on additional inputs.

As noted above, the operational status of the machine may be indicated to the operator through an alphanumeric display 54 (See FIGS. 2 and 5). The alphanumeric display may be any of a variety of commercially available displays capable of interfacing with the microprocessor 48. The microprocessor 48 supplies the display 54 with information for display in accordance with information received over the input bus 50 or through other inputs which indicate to the microprocessor 48 the mode of operation of the machine as well as whether any errors have been detected in operation. Preferably, error codes displayed on the display 54 flash or blink to enhance the noticeability of the detected error.

Examples of errors which may be detected by the microprocessor 48 are jams in the feed or cutting assemblies 19, 26. To facilitate detection of such errors it is preferable that an encoder 144, such as an inductive proximity switch, be positioned proximate the coining gears of the gear assembly 22 to sense rotation and rotational speed of the gears and feed motor 24 (See FIG. 1), although other forms of detection means could be employed to sense the rotational speed of the various components of the feed assembly 19. If the microprocessor 48 determines that the rotational speed of the feed motor 24 has dropped below a certain threshold which is indicative of a paper jam in the feed assembly 19, such as in the gear assembly 22 or forming assembly 20, the microprocessor stops the feed motor 24 and displays an appropriate error code on the display 54 so the operator can attend to correction of the error.

To detect a jam in the cutting assembly 26, the microprocessor 48 may similarly monitor the position of the cutting blade as determined by the blade position detecting circuit 112 (See FIG. 7). If the blade is not in its rest position after a cut or does not return to its rest position after a period of time from the initiation of a cut cycle, the microprocessor 48 will disable the cutting operation of the machine and send an appropriate error code to the display 54 to inform the operator of the jam in the cutting assembly 26.

Figure 9:
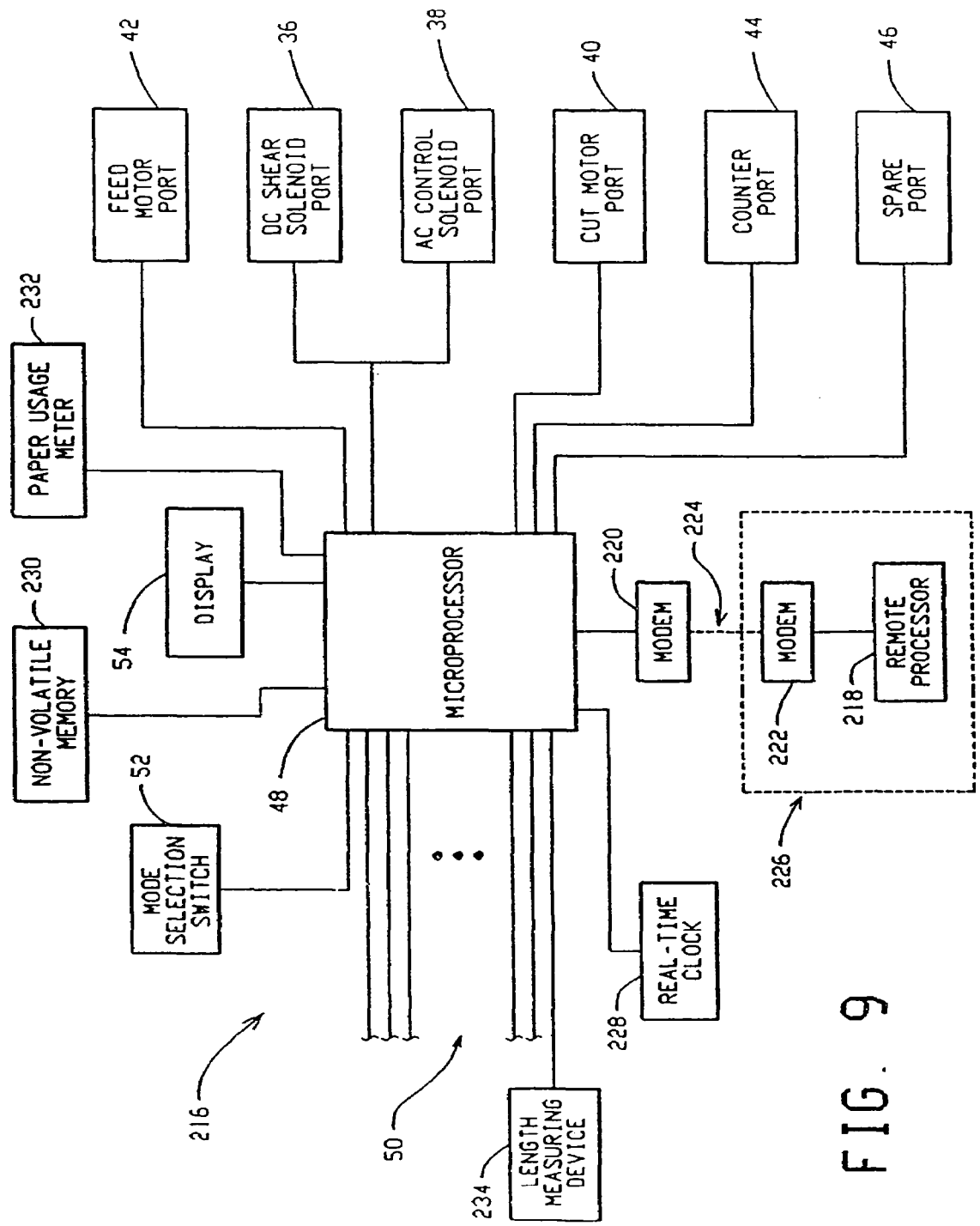
FIG. 9 is a block diagram of a controller for a cushioning conversion machine with enhanced diagnostic capabilities.

With reference to FIG. 9 there is shown a controller 216 for communication with a remote processor 218, such as a remote terminal or personal computer, through a pair of modems 220, 222, respectively, over a transmission line 224. (The remote processor 218 and corresponding modem 222 are designated as separate from the controller 216 by the dashed box 226 indicating a remote location, such as a service center.) The controller 216 is generally equivalent to the controller 16 described above relative to FIGS. 1 through 8. As is discussed above, the microprocessor 48 receives a number of inputs 50 corresponding, for example, to events detected by the current sensing circuits shown in FIGS. 6 through 8. The information sensed by the current sensing circuits includes the operational status of the machine, such as whether the machine is in the key pad mode, the electric dispensing mode, the automatic cut mode, etc., and further includes detection of machine errors, such as jams in the feed or cutting assemblies 19, 26, as well as the number of cuts that have been completed by the machine, the number of pads that have been produced by the machine and various other information.

The controller 216 may also be provided with a real-time clock 228 to permit the microprocessor 48 to record a number of timed events, for example the total time the machine is on, the total time the machine is active as opposed to the time devoted to maintenance, the time spent in each of the operational modes, the total time the feed motor or cut motor is running and the total time the feed motor is operating in reverse. The real-time clock 228 can also be used to time and date stamp occurrences of faults detected by the microprocessor 48.

All information received by the microprocessor 48 may be stored in a non-volatile memory 230 for later retrieval. When desired, the information stored in the non-volatile memory 230 may be accessed from a remote location 226 through communication between the remote processor 218 and the microprocessor 48 over the modems 220 and 222. The modems 220 and 222 may be conventional commercially available modems communicating over a telephone link 224 through conventional communications protocols as would be appreciated by those skilled in the art.

The information stored in the non-volatile memory 230 of the controller 216 may be automatically downloaded to the remote processor 218 at pre-planned timed intervals, for example, at the end of a day, or the end of a week. Alternatively, a service person at the remote location 226 can instruct the microprocessor 48 through the connection with the remote processor 218 via the modems 220 and 222 to download the information stored in the non-volatile memory 230 to the remote processor 218 as desired. Further, the connection between the remote processor 218 and the microprocessor 48 allows a service person to view in near real-time the status of all of the machine inputs 50, corresponding to the sensors and other inputs described above, while the machine is running. This enables the service person to diagnose effectively errors in the machine 10 since the service person is able to look at the inputs 50 as an error is occurring. The information downloaded to the remote processor 218 from the non-volatile memory 230 can also be used to schedule maintenance for the machine and to perform billing functions in instances where a customer is charged for use of the machine 10 based on its operating time, on the amount of paper fed through the machine, or on the length or number of pads produced by the machine.

In instances where a service person is at the site of the cushion conversion machine 10 it is also possible to access the non-volatile memory 230 through the same port provided for communication with the remote processor 218. In such a case instead of the modem 220 being connected to the microprocessor 48, a personal computer or other terminal may be connected to the microprocessor 48 for access to the information stored in the non-volatile memory 230. This allows a service person more access to the informational inputs 50 to the microprocessor 48 during servicing of the machine.

The microprocessor 48 resident in the cushioning conversion machine and the remote processor 218 can also function as a real time diagnostics system for the cushioning conversion machine by utilizing the modems 220 and 222 and the transmission line 224 to provide real time or near real time communication between the microprocessor and the remote processor. Near real time communication permits an operator at a central location, such as a servicing or manufacturing location 226, to obtain operational information on the performance of a cushioning conversion machine as the machine is operating. The machine information may be used as a preventative measure to determine if the machine is functioning properly or is in need of preventive maintenance. For example, if the remote processor 218 determines based on information received from the microprocessor 48 in real time that a motor runs excessively long or draws excessive current following a certain command from the microprocessor, the remote processor can infer that the motor is excessively worn and schedule a replacement before the motor fails. The machine information may also be used to diagnose or correct machine problems, as well as to determine if the machine is being operated correctly by an operator.

Some types of information which the remote processor 218 can receive from the machine microprocessor 48 include the status of any machine input, such as the operation mode of the machine, any keypad inputs, cut complete signals, operation of the footswitch or cut buttons, as well as other inputs received by the microprocessor indicating the machine operation. The microprocessor 48 may also provide information to the remote processor 218 relating to control commands or instructions produced by the microprocessor, including outputs to any of the ports, such as the feed motor port 42, the cut motor port 40 or the solenoid ports 38, 40. The remote processor 218 can also access, through the microprocessor 48, any of the machine RAM locations or the non-volatile memory 230 to provide an in depth view of the functioning of the machine and to analyze whether the microprocessor is receiving and processing data correctly.

Aside from requesting information from the microprocessor 48, the remote processor 218 can also provide inputs to the microprocessor to instruct the microprocessor to execute a predetermined test or the remote processor may change values in the microprocessor accessible RAM to monitor the functioning of the cushioning conversion machine in accordance with desired inputs.

Consequently, a skilled servicing technician at a central location can follow the operation of a remote cushioning conversion machine in real time or near real time as the machine is operating to allow the servicing technician to readily ascertain the functioning of the machine and to correct errors remotely, to recommend different operating guidelines to an operator or to aid a technician actually working with the machine in diagnosing and correcting problems in the machine.

Figure 10:
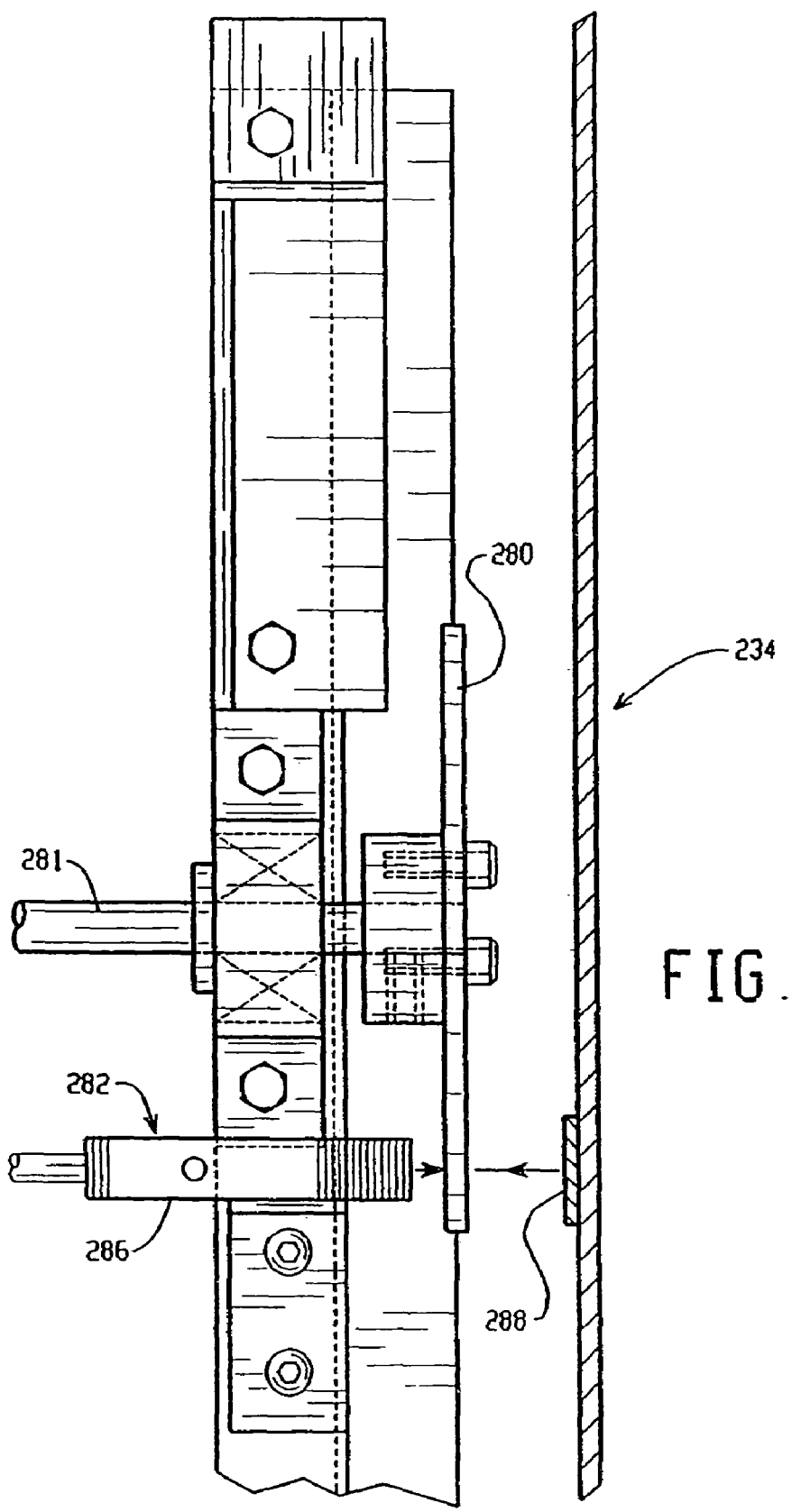
FIG. 10 is a front view of a length measuring device and other relevant portions of the cushioning conversion machine.
Figure 11:
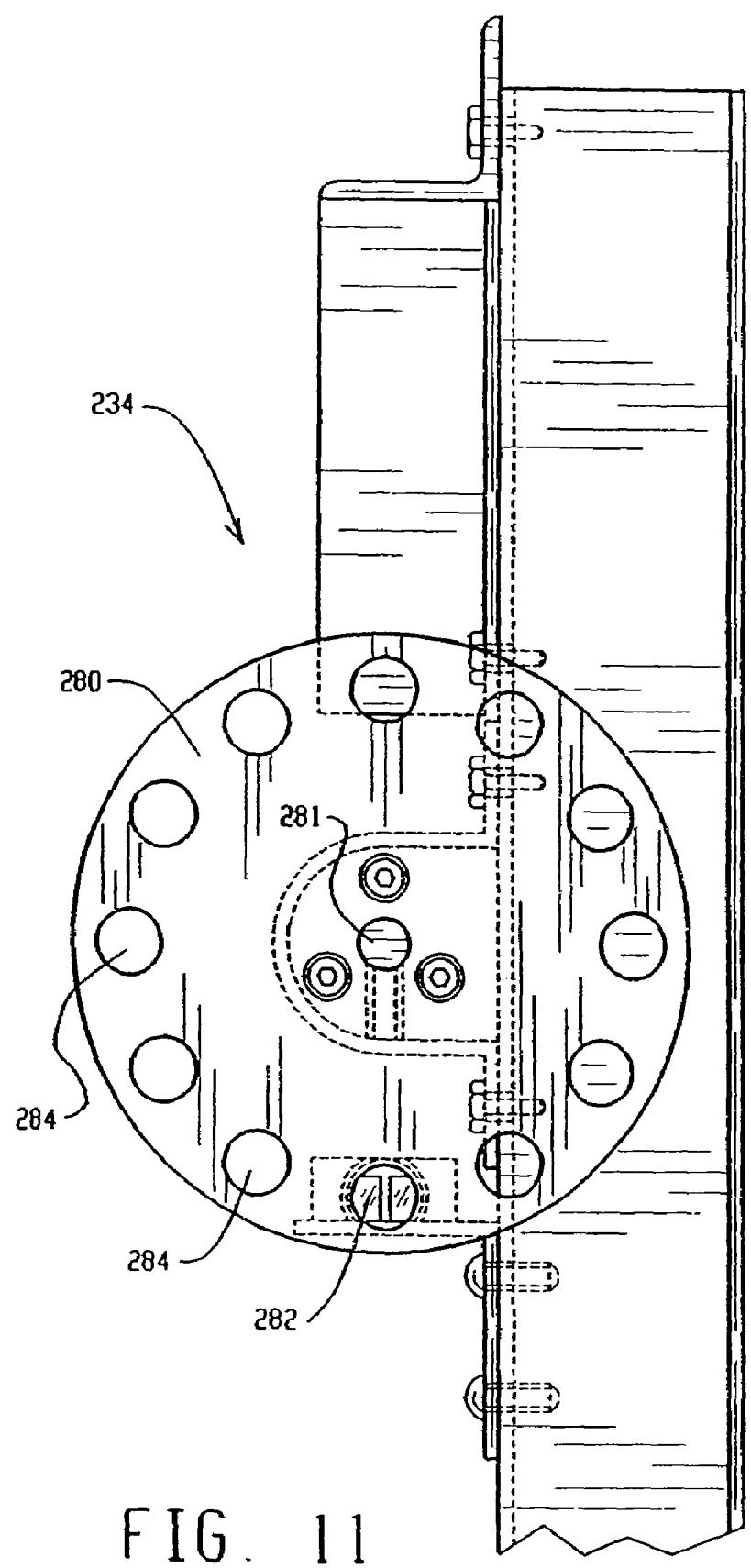
FIG. 11 is a side view of the length measuring device.

In instances where a customer is charged for usage of the machine based on the amount of paper used it may be desirable to provide a paper usage meter 232 in communication with the microprocessor 48. While it is possible for the microprocessor 48 to keep a running total of paper used by the machine in the non-volatile memory 230 by indirectly measuring the time that the feed motor is running as determined by the real time clock 228 and by multiplying that time by the paper speed, provided that the speed of the feed motor is known and constant, in some instances the paper usage may be more accurately determined by use of the paper usage meter 232. Such a meter may include a contact roller which rolls along the paper fed into the machine to directly measure the length of paper used or may be embodied through some other conventional means of measuring length. The paper usage, as well as other information stored in the non-volatile memory 230 may be made available for display when desirable on the display 54 as well as through the remote processor 218 as is described above.

Where it is desired to accurately determine the amount of dunnage product or padding produced by a machine, such as for billing purposes or when the length of the pad to be produced must closely fit within a container, the machine 10 may be provided with a length measuring device 234. An embodiment of a length measuring device is shown in FIGS. 10 and 11 and more fully described in co-owned U.S. patent application Ser. No. 08/155,116, which is incorporated in its entirety by this reference. The illustrated length measuring device 234 is positioned to monitor the angular movement of the gear assembly 22. The length measuring device 234 includes a rotating member 280 which is attached to the gear shaft 281 and a monitor 282 which monitors the angular motion of the member 280, and thus the gear shaft 281. Preferably, the rotating member 280 is a disk with a series of openings 284 arranged in equal circumferential increments. More preferably, the rotating member 280 is a black, nonreflective, aluminum disk with twelve openings. In this manner, each opening 284 will correspond to a 30° angular movement and, in the preferred embodiment, one inch of pad length.

The monitor 282 comprises a photo-optic transmitter/receiver 286 which transmits and receives light beams and a reflector 288 which reflects the transmitted light beams. The transmitter/receiver 286 is mounted on the machine frame and is positioned so that, as the rotating member 280 turns, transmitted light beams will travel through the openings 284. The photo-optic transmitter/receiver 286 preferably includes electrical circuitry capable of relaying interruptions in the receipt of light beams. The reflector 288 is mounted on the machine frame and is positioned to receive transmitted light beams which travel through the openings 284.

As the rotating member 280 turns, light beams transmitted by the transmitter/receiver 286 will pass through a first opening 284, contact the reflector 288, and reflect back to the transmitter/receiver 286. Once this opening 284 rotates out of alignment with the transmitter/receiver 286 (and the reflector 288), the receipt of reflected light beams by the transmitter/receiver 286 will be interrupted until the next opening 284 moves into alignment. Thus, with the preferred rotating member 280, twelve interruptions would occur for every revolution of the member 280, and thus for every revolution of the drive gear shaft 281.

The transmitter/receiver 286 relays the occurrence of an interruption to the processor 48 (FIG. 9) in the form of a pulse. The processor 48 uses this information to control the gear assembly 22 (i.e., to send activation/deactivation signals to the feed motor over the feed motor port 42) and thus uses this information to control pad lengths as well as to determine and store in the non-volatile memory 230 the total length of pad produced.

Figure 12:
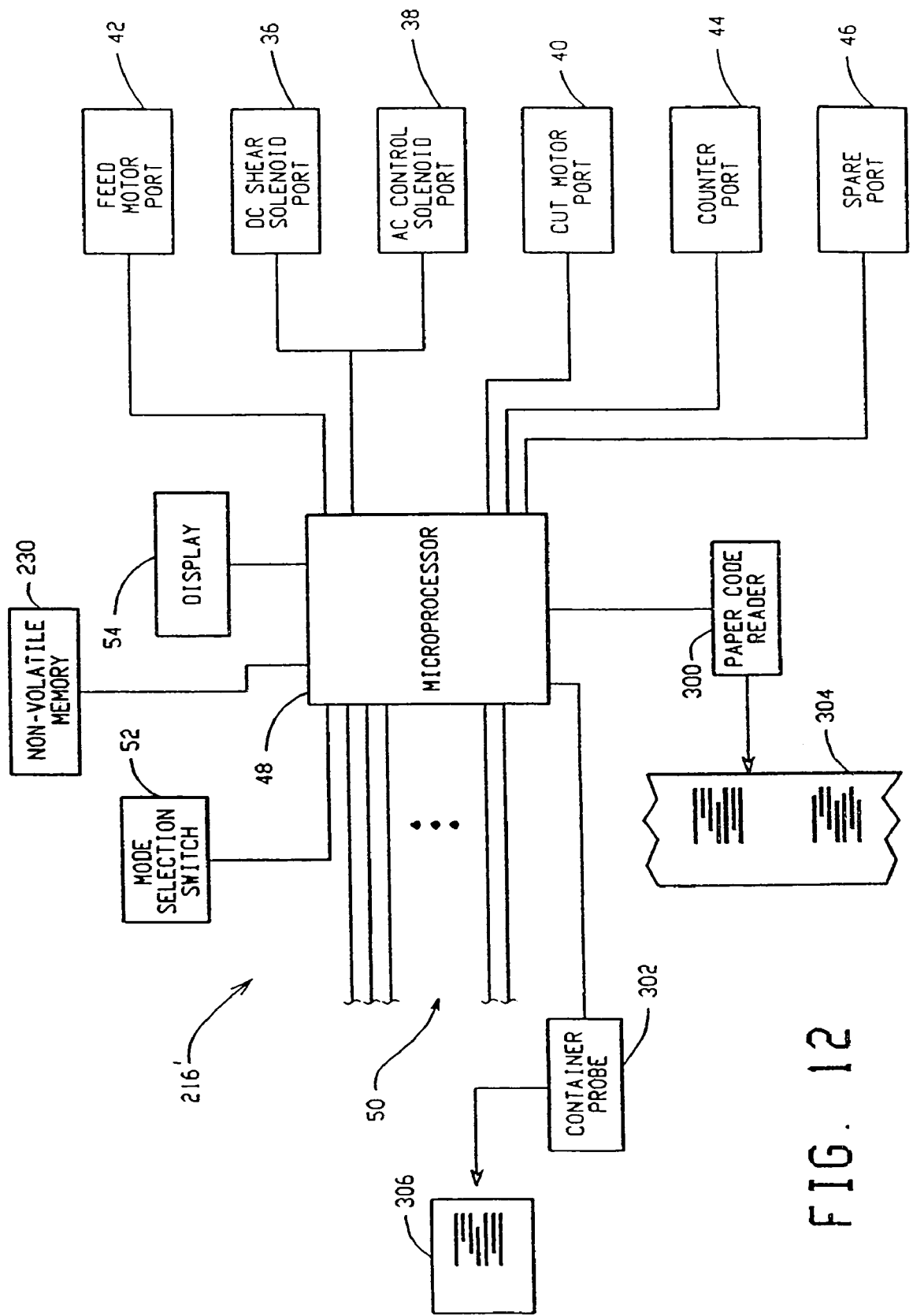
FIG. 12 is a block diagram of a controller including a code reader for reading information from stock paper and a container probe for determining packaging information from a container to which packaging is to be added.

Referring to FIG. 12, there is shown a controller 216' substantially the same as the controller 216 described above and including a paper code reader 300 and a container probe 302. While the controller 216' is illustrated with only the code reader 300 and container probe 302 and the non-volatile memory 230, the controller may also include the modem 220 for communication with a remote processor 218, the real-time clock 228, the paper usage meter 232 and the length measuring device 234 described with reference to FIG. 9. The paper code reader 300 and the container probe 302 may also be used separately or together.

The paper code reader 300 reads information encoded on the stock paper 304 as the paper is fed through the machine prior to the paper entering the conversion assembly 20 in order to identify or to verify the stock paper type, source or lot. Such information may aid the service person in diagnosing machine problems, such as problems which have occurred among machines using a particular paper lot, or may be used to determine information regarding the cushioning properties of a pad formed from such paper as may vary between, for example, single or multi-ply paper stock. The latter type of information may be of particular value where the machine 10 automatically determines and produces the amount of pad to adequately cushion a given container. The controller 216' may in some instances be adapted to produce pads only upon the verification of certain types of stock paper by the paper code reader 300, such as to as an example prevent damage to the machine 10 from the use of inappropriate stock paper material.

The paper code reader 300 is preferably a conventional bar code reader with the stock paper bearing an appropriate bar code encoded with the desired information. The paper code reader 300 can also be used to supply paper length information to the processor 48 when the bar codes are printed on the stock paper 302 at known spatial intervals or are encoded with length information. The paper code reader 300 may also be another type of information retrieval system including, for example, an optical code reader other than a bar code reader or a reader adapted to read or to detect the presence of encoded information using ultraviolet light.

Information detected from the paper stock 304 by the paper code reader 300 is transferred to the processor 48 where it may be acted upon and/or, as desired, stored for latter retrieval from the non-volatile memory 230. The number of rolls or amount of stock paper used from a particular source or the number of rolls or amount of stock paper used of a certain grade, thickness or ply are examples of useful information for storage in the non-volatile memory 230.

The container probe 302 may be embodied as a code reader such as a bar code reader which reads information from a container 306 for determining the amount of pad and the lengths of pads to produce to adequately cushion the container. In such an instance a bar code would be printed on or otherwise affixed to the container 306 or to a packaging invoice supplied with the container and the bar code reader would be positioned to read the bar code as the container is conveyed to or the bar code is placed at a known position relative to the machine 10. Upon reading the information from the bar code, the container probe 302 will transfer the information to the processor 48 which may use the information to instruct the machine 10 to produce the required number and lengths of pads as determined by a look-up table or as directly encoded into the bar code. The operator would then take the pads automatically produced by the machine 10 and place them in the container 306 without further interaction between the operator and the machine.

The container probe 302 may also be in the form of probe which actually measures the void volume of the container. Such a probe may include a mechanical probe such as a plunger, an air cylinder or other low pressure probe which probes the container 306 to determine the volume of padding necessary to fill the container. A mechanical probe may probe the container 306 in one or in multiple locations to determine the amount of pad needed. The mechanical probe may also be used in conjunction with a bar code reader or used in conjunction with or supplanted with sensors which sense the dimensions or degree of fill of the container 306 including optical and ultrasonic sensors and sensor using other forms of machine vision or pattern recognition.

Figure 13:
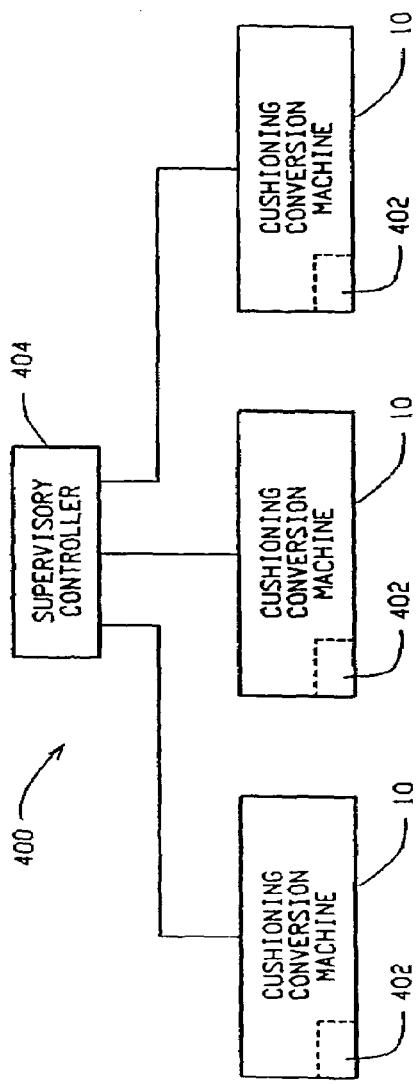
FIG. 13 is a block diagram of a fault tolerant cushioning producing network.

A fault tolerant cushioning producing network 400 is illustrated schematically in FIG. 13. Such a network 400 would typically include a number of cushioning conversion machines 10 each preferably having a controller 402 such as the controllers 16, 216 and 216' described above for controlling the pad producing and diagnostic functions of the machine. The individual machines 10 would also be controlled by a supervisory controller 404 which may be a devoted supervisory controller implemented in a personal computer or similar processor or may be resident in a cushioning conversion machine in which case it would control its host machine as well as provide supervisory control functions to its host machine and the other machines in the network 400. The supervisory controller 404 may communicate with controllers 402 of each machine 10 in a conventional "master-slave" mode or the controllers may communicate with each other in a conventional "peer-to-peer" mode depending on the level of intercommunication between the machines 10 that is desired and whether it is desired to employ a master supervisory controller.

When the network 400 is operating in the master-slave mode, individual or plural machines 10 are instructed by the supervisory controller 404 to produce pads of the desired number and lengths. The supervisory controller 404 can divide up the work load among the different machines according to work schedules and maintenance schedules of the machines and can bypass or reallocate work from a machine which has informed the supervisory controller of a fault condition, such as a paper jam, or that the machine has run out of paper stock. The machines may also communicate information and fault conditions with each other. While it is preferable that each machine 10 is provided with a separate controller 402, a machine may be controlled through the supervisory controller 404 without the need of an individual controller for each machine.

Figure 14:
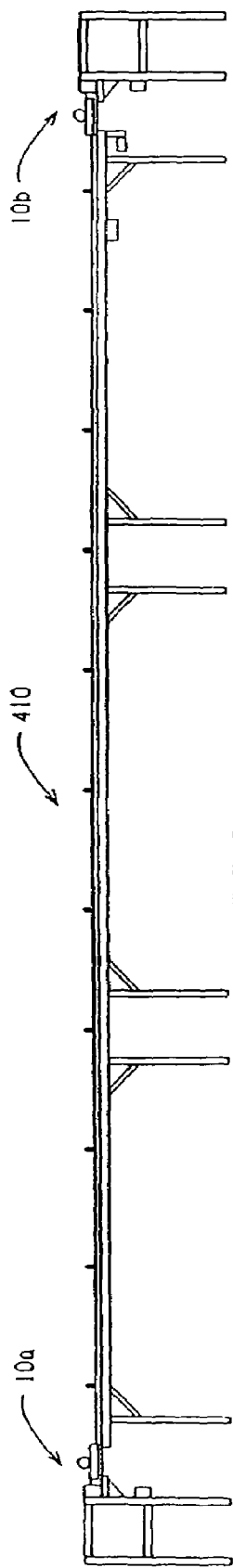
FIG. 14 is an illustration of two cushion producing machines positioned at either end of a conveyor and communicating via a network.

When the network 400 is operating in the peer-to-peer mode, a primary or first machine is active producing pads while the remaining machine or machines are inactive. If the first machine fails, the remaining machine or machines can automatically take over for the first machine. Such a network could be implemented between two machines 10a and 10b at either end of a reversible conveyor system 410, as shown in FIG. 14. In this case, in normal operation one machine is active while the other machine is idle. The active machine, say machine 10a, produces pads of the desired length and deposits the pads onto the conveyor system 410 which carries the pad away from the active machine 10a and to an operator. If the machine 10a becomes inoperable, such as due to a jam or lack of paper for instance, or a switch is desired at a scheduled intervals, the machine 10a becomes inactive and the machine 10b takes over the pad producing functions. At this time the direction of the conveyor system 410 would also reverse direction to carry pads produced by the machine 10b away from that machine and to an operator.

While a number of controllers have been described above relative to a number of specific cushioning conversion machines, it will be readily apparent that the controllers of the present invention have a wide range of applications in controlling the operation of many types or configurations of cushioning conversion machines. The versatility and structure of the controllers as well as the provision of spare controller ports also permits customization of controller functions for different machine applications and control of accessory devices.

Figure 15:
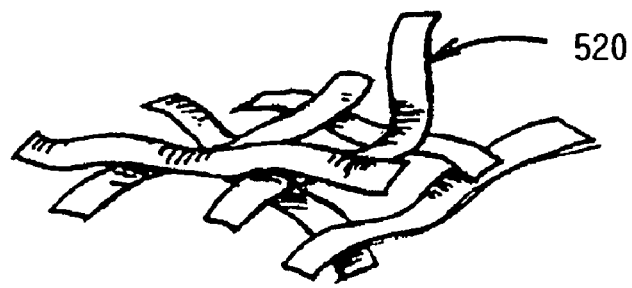
FIG. 15 is a simplified, isometric view of strips of shredded paper as found in the prior art.

For example, referring now to FIGS. 15–23, a different type of packaging material conversion machine is disclosed, a conversion machine for converting sheet material into a plurality of elongated, crimped strips. Referring to the drawings and particularly to FIG. 15, wherein like reference numerals indicate like parts throughout, the prior art generally teaches that sheets of paper may be cut into elongated strips 520. The strips 520, however, do not provide a substantial amount of resiliency or forgiveness when subjected to a force or other mistreatment. Consequently, a large number of strips 520 are undesirably required to fill a given empty space.

Figure 16:
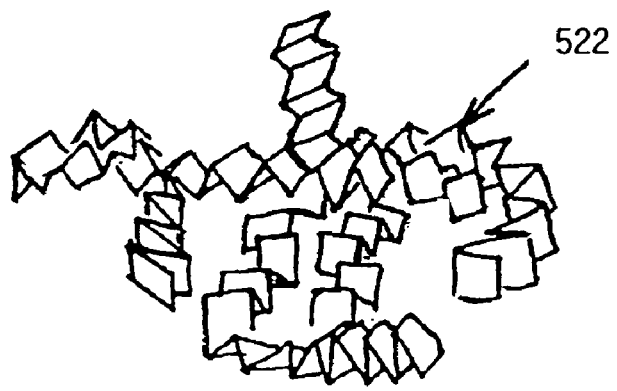
FIG. 16 is a simplified, isometric view of a plurality of folded, crimped, interlocking strips of shredded sheet material as produced by the present invention.

Referring now to FIG. 16, there is illustrated a plurality of shredded, elongated, interconnecting strips 522 which have been folded and crimped using the apparatus and methods as taught herein. The folds within the crimped strips 522 interlock with one another to form a resilient mass of intertwined and interconnected strips of decorative or bulk packaging material. The folds also form a variety of differently angled flanges and/or webbing which, when used as a packing material, distribute a blow or impact received in a disbursed manner throughout each interconnect fold of the interlocked crimped strips 522 to prevent damage to the packed item. The folds also cause the crimped strips 522 to occupy a greater volume of space, using a smaller amount of sheet material than would otherwise be required.

Figure 17:
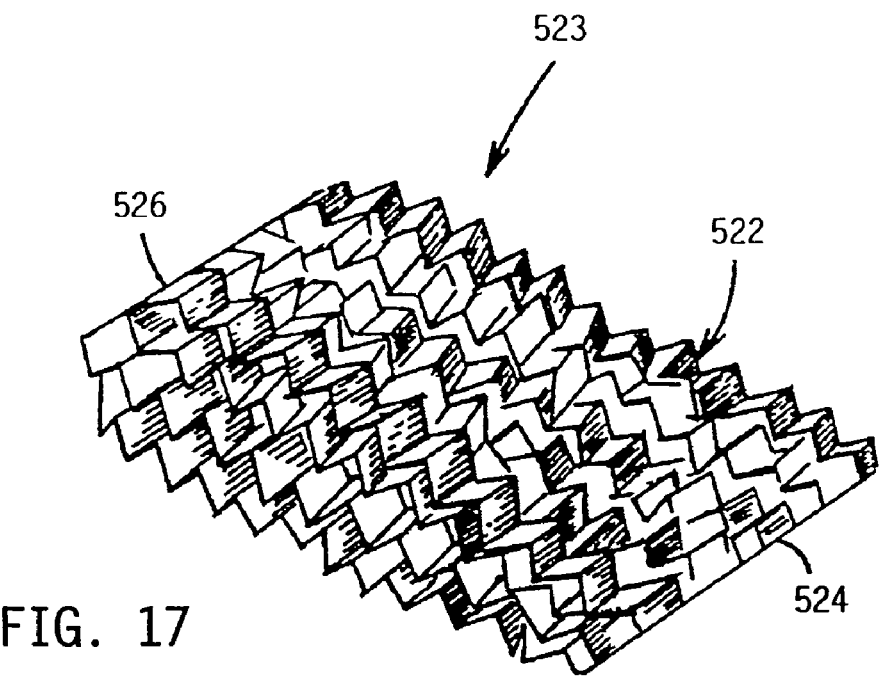
FIG. 17 is a simplified, isometric view of a plurality of folded, crimped, interlocking strip segments of shredded sheet material which is a product of the present invention.

Turning now to FIG. 17, a plurality of shredded, elongated, interconnecting strips 522 which have been folded, crimped, and sheared into strip segments 523 are shown. The strips 522 may also have been bonded together at a forward terminal end 524 and a rearward terminal end 526 thereof to form the strip segment 523. The formation of the interlocked crimped strips 522 of FIG. 16 and the sheared strip segments 523 of FIG. 17 will now be described in conjunction with FIGS. 18–23.

Figure 18:
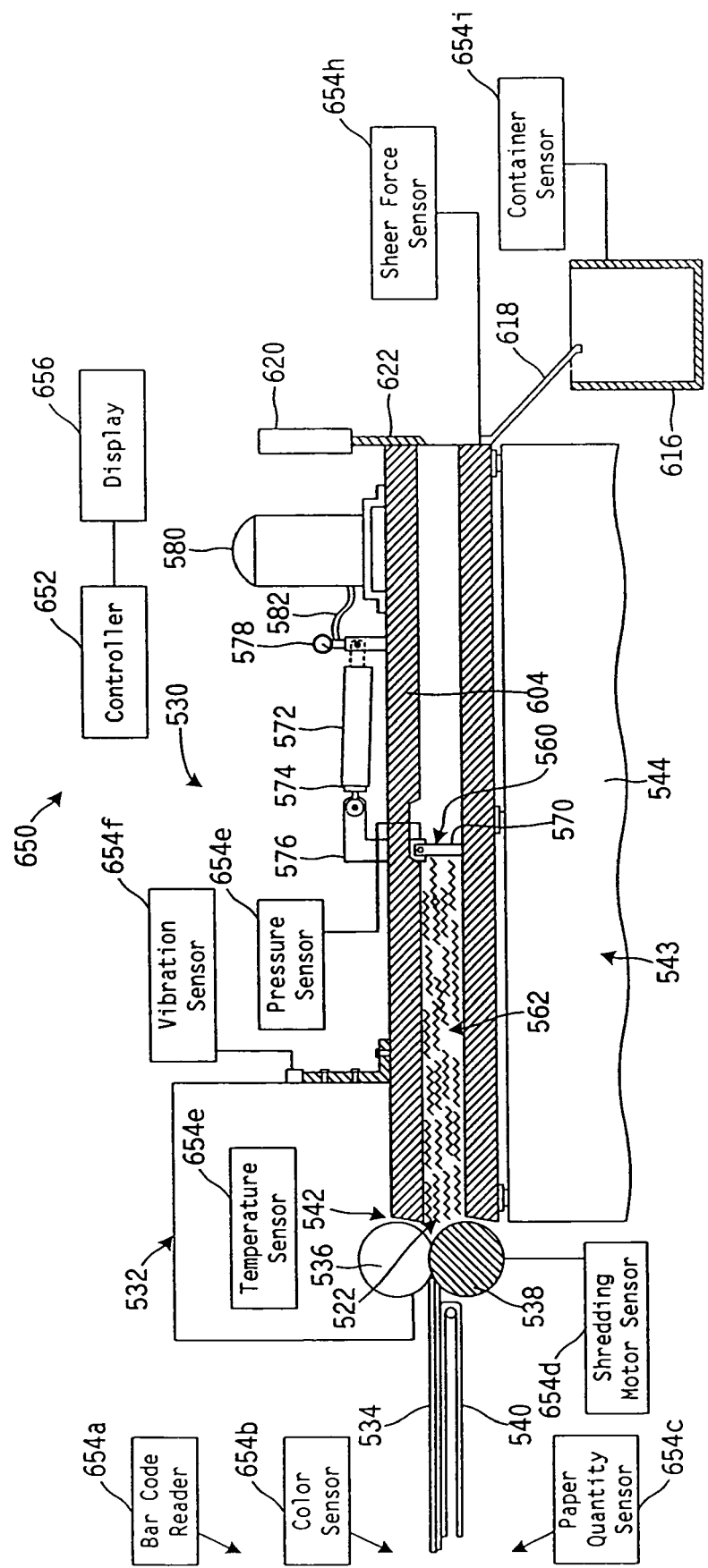
FIG. 18 is a partial, cross-sectional, side elevational view of one embodiment of the present invention, wherein a conversion machine is monitored by a universal controller and a plurality of sensors.

FIG. 18 illustrates one embodiment of the present invention, that is, a conversion machine 530 which includes a shredding device 532. Although various shredding devices 532 are well known in the prior art and each are contemplated by the present invention, the shredding device 532 receives sheet material 534 and feeds the sheet material 534 into a plurality of parallel cutting blades 536 and 538 which rotate to longitudinally cut the sheet material 534 into a plurality of strips 520 (FIG. 15). A conveyor belt 540 may be used to support and urge the sheet material 534 into the cutting blades 536 and 538. The conveyor belt 540 may be free rolling, but preferably is powered by a motor or belt assembly as will be discussed in greater detail infra with respect to FIG. 20. The cutting blades 536 and 538 may be smooth or serrated cutting blades to facilitate the longitudinal cuffing of the sheet material 534.

When passed between the cutting blades 536 and 538, the sheet material 534 is cut into the elongated strips 520 (FIG. 15) which are then directed toward, and expelled outwardly from, an exit opening 542 of the shredding device 532. The elongated strips 520 are generally expelled through the exit opening 542 at a very rapid rate, for example, a rate of about 125–450 feet per minute.

The conversion machine 530 may include a durable and inexpensive discharge chute attachment 543 which is either local to or in physical attachment with the shredding device 532. As the sheet material 534 is converted into the elongated strips 520 as it exits the parallel cutting blades 536 and 538, the elongated strips 520 (FIG. 15) are initially impacted or impelled against a barrier 560. The barrier 560 causes the shredded strips 520 (FIG. 15) to assume a partially jammed state within a compression chamber or confined area 562 located between the barrier 560 and the cutting blades 536 and 538.

Continued shredding of additional sheet material 534 by the shredding device 532 forces additional elongated strips 520 (FIG. 15) into the confined area 562, forming a dam of temporarily jammed strips 520 (FIG. 15). Once a dam of shredded strips 520 is formed, the front of the dam, which is located most closely to the cutting blades 536 and 538, serve as an additional barrier mechanism. As additional amounts of the sheet material 534 are fed or pulled into the shredding device 532, the expelling force exerted by the cutting blades 536 and 538 forces the strips 520 (FIG. 15) into the confined area 562. As the strips 520 (FIG. 15) are forced against the barrier 560, the strips 520 (FIG. 15) are confined within the confined area 562 and are forced to fold against themselves in a relatively controlled manner. Such folding and further insertion of strips 520 (FIG. 15) into the confined area 562, causes the folded strips to become compacted against themselves in relatively uniformly generated folds, thereby resulting in the accordion-shaped mass of crimped strips 522 as illustrated in FIG. 16.

Figure 19:
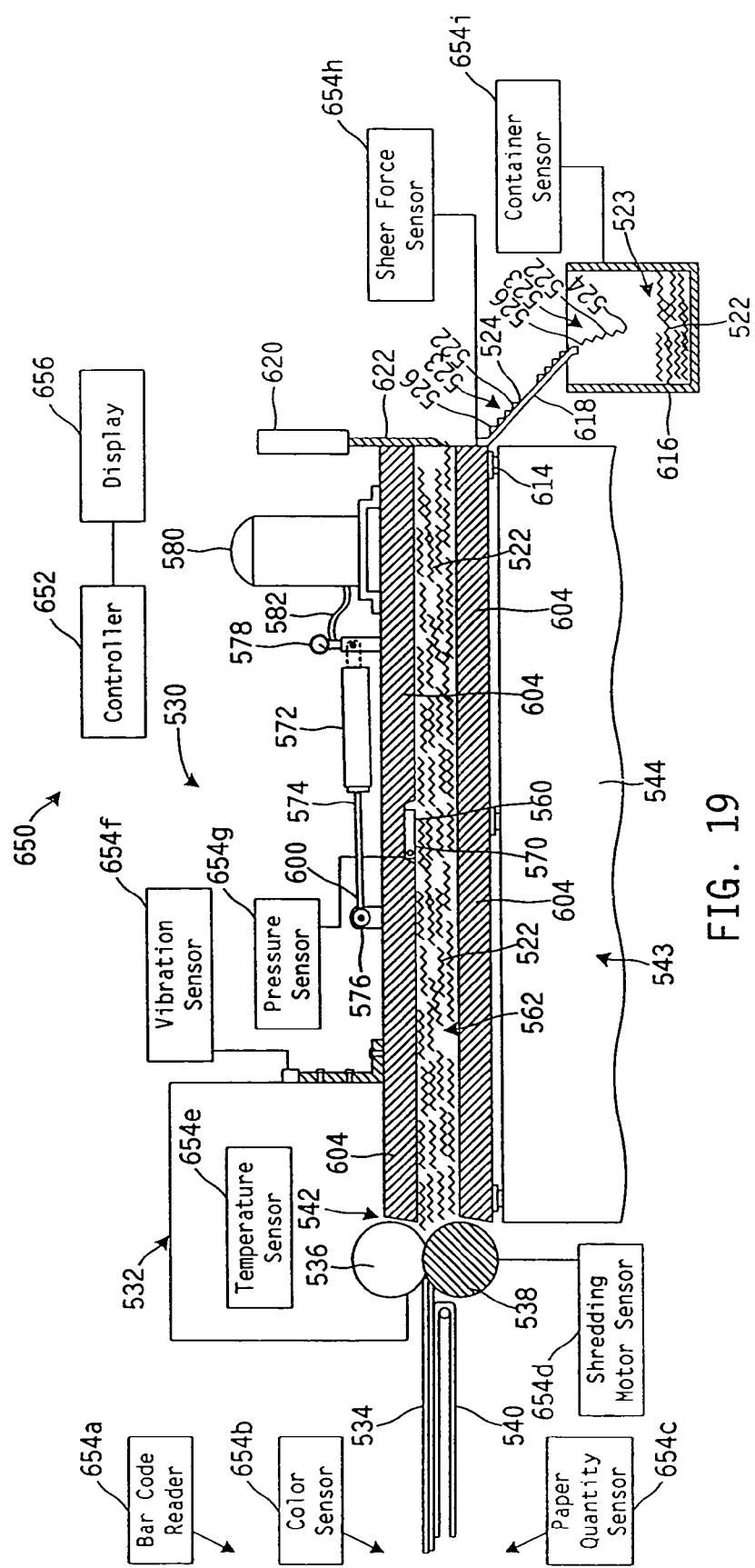
FIG. 19 is a partial, cross-sectional, side elevational view of the apparatus shown in FIG. 18, wherein the gate of the conversion machine is urged away from its closed position.

The function of the discharge chute attachment 543 is to serve as a pressure sensitive barrier 560 for temporarily damming a passage of the strips 520 (FIG. 15) which are expelled from the shredding device 532. Consequently, the conversion machine 530 has a means for urging the barrier 560 toward a closed position. Preferably, the barrier 560 is a compression door or gate 570 having a closed position located within a generally vertical plane, and an open position, located within a generally horizontal plane. FIG. 18 illustrates the gate 570 in a closed position, while FIG. 19 illustrates the gate 570 in an open position with the crimped strips 522 traveling through a guide portion 604.

Initially the gate 570 is urged toward its closed position by an urging means 572. The urging means 572 may include a spring, a weight, or a pneumatically or hydraulically controlled piston 574 which is connected to the gate 570 by a linkage assembly 576. The force exerted by the urging means 572 upon the gate 570 may be controlled by either the type of the characteristics of the spring used, or by a valve mechanism attached to the piston 574, depending upon the urging means utilized. If, for example, a piston assembly is utilized, a fluid or air pressure reservoir 580 may be provided and appropriately connected to the piston 574 via a hose assembly 582, as illustrated in FIG. 18. Electronic pressure sensors may also be used to determine the amount of pressure which is being exerted upon the gate 570 and to activate and/or release the urging means 572 when needed.

In the preferred embodiment, the confined area 562 is defined by the gate 570, its sidewalls (not shown), the guide portion 604 and by the cutting blades 536 and 538. Once a dam, however, of partially jammed crimped strips 522 are within the confined area 562, the frictional resistance between the crimped strips 522 and the interior surfaces of the guide portion 604 provides sufficient retaining force to eliminate the need for the gate 570. At this point the gate 570 may be automatically or incrementally raised to its open position as illustrated in FIG. 19. In this manner the remaining dam of the crimped strips 522 serve the same function as the gate 570 by providing a barrier by which the strips fold against themselves in a relatively controlled manner thereby creating the crimped strips 522. In an alternative embodiment, a barrier-less paper restriction mechanism may be employed such as, for example, a narrowing passageway in which the strips 520 experience increased restriction as it travels along the passageway. Consequently, the folded, crimped strips 522 may be generated without use of the gate 570 or other mechanism as the barrier 560.

The length of the crimped strips 522 may also be adjusted. A cutting, chopping, or shearing device 620 may be engaged at preselected intervals to cut the compressed strips 522 into the strip segments 523 as illustrated in FIG. 17. The shearing device 620 may be a cutting blade 622 to cut the compressed crimped strips. The length of the crimped strips 522 may be controlled by regulating the rate of passage of the strips 522 through the conversion machine 530 and/or by regulating the rate or time interval between which the blade 622 cuts the strips 522. Therefore the conversion machine 530 may produce variable lengths of crimped strips 522. After the crimped strips 522 have been formed they exit the confined area 562 and guide portion 604, and are deposited in a receiving bin 616 via a chute or ramp 618, as illustrated in FIG. 19.

FIGS. 18 and 19 illustrate an embodiment in which the sheet material 534 is advanced through the shredding device 532 and the length of the various crimped strips 522 is then determined by the shearing device 620. If, however, it is desired to provide pre-cut sheets of the sheet material 534 rather than transversely cutting the packaging material after it is formed, a feeder section 702 having a transverse cutting component 722 may be provided upstream from the shredding device 532 as illustrated in FIG. 20.

Figure 20:
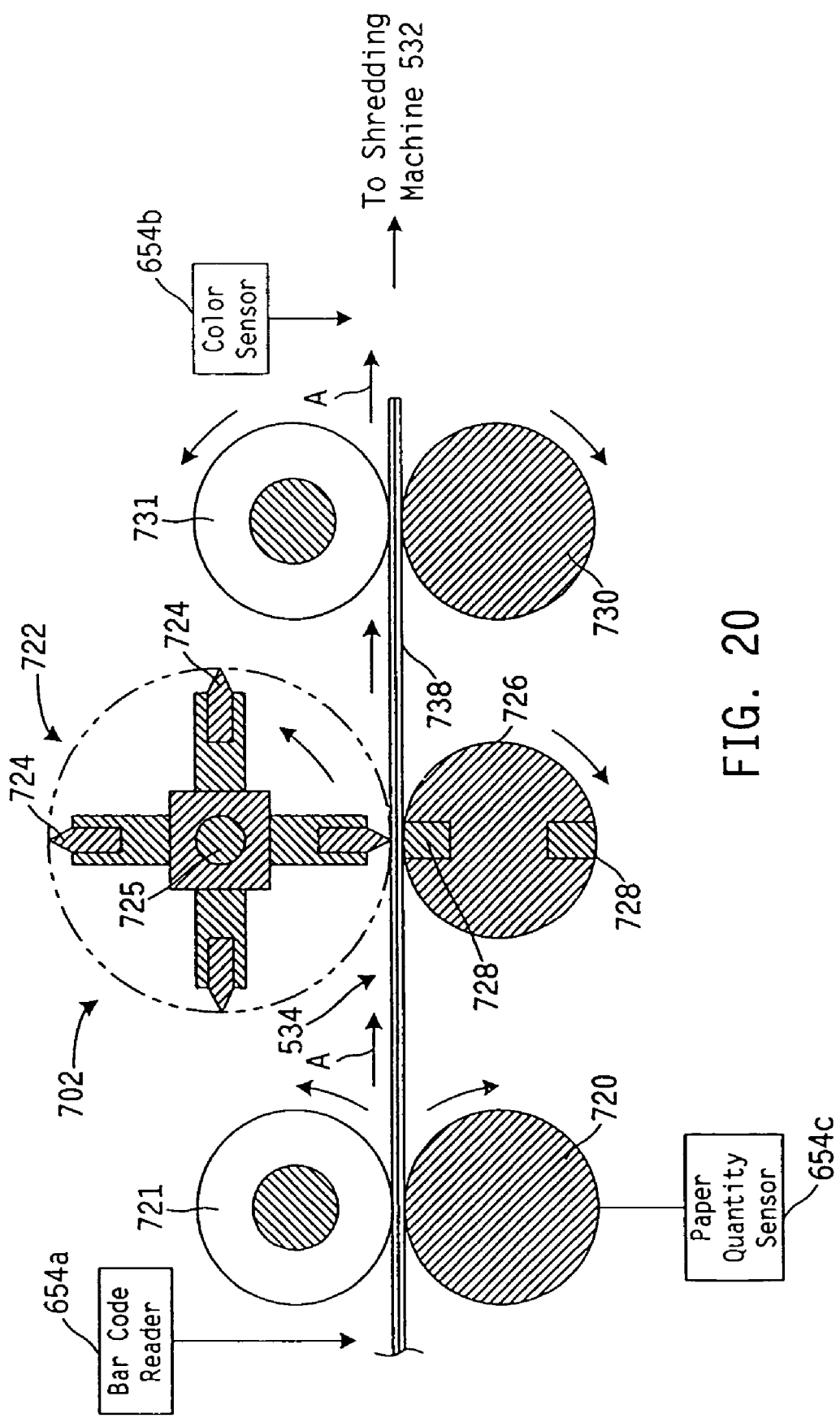
FIG. 20 is a fragmentary, sectional side elevational view of a controllable feeder apparatus according to one embodiment of the present invention.

The feeder section 702 of FIG. 20 contains a transverse cutting component 722 which includes four rotating cutting blades 724 which are mounted for rotation on a shaft 725. A cylinder roller 726 is in alignment with the shaft 725 and preferably includes elastomeric material sections 728 for specific alignment in cooperation with the blades 724. Each of the blades 724 preferably includes a generally serrated edge but also includes several gaps along its transverse length in order to provide only a partial cut of the sheet material 534 as it transfers thereunder in direction "A". With the sheet material 534 being transversely cut, it is advanced to a second pair of drive rollers 730 and 731 for further direction to the shredding device 532 to maintain the sheet material 534 in a position for advancement to the cutting component 722. A first biased roller means 721 is biased toward and in alignment with the first drive roller 720, wherein a second biased roller means 731 is biased toward and in alignment with the second drive roller 730. In such a manner, the sheet material 534 is advanced to the shredding device 532 with the sheet material 534 cut in predetermined lengths.

Figure 21:
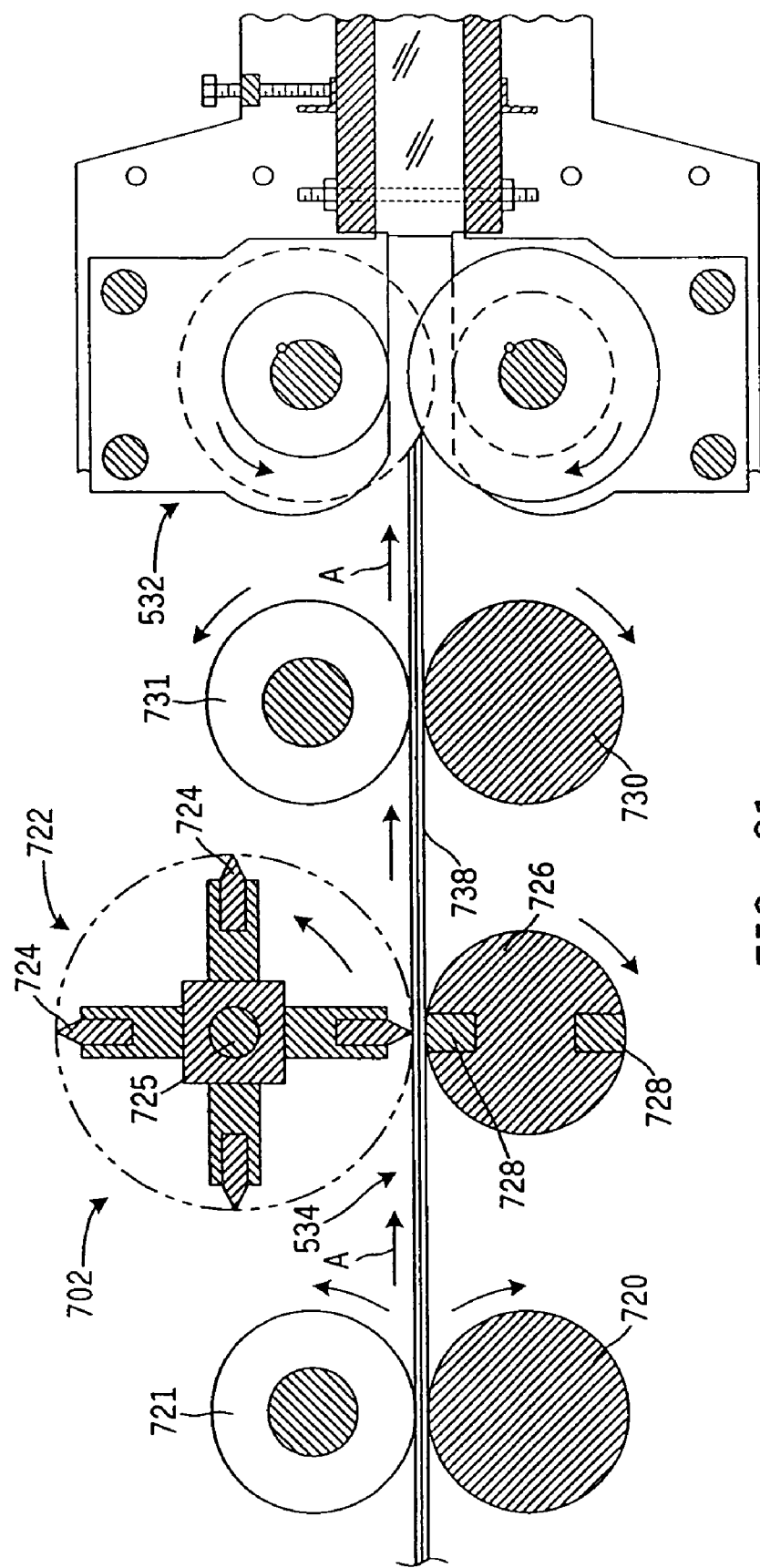
FIG. 21 is a side fragmentary, sectional side view of a controllable feeder apparatus that is integrated with the conversion machine.

The first pair of drive rollers 720 and 721, the backing cylinder 726 and the second pair of drive rollers 730 and 731 all rotate at approximately the same circumferential speed. Each of the components in the feeder section 702 are preferably greater than 15" wide in order to provide the sheet material 534 to the shredding device 532, thereby making the conversion machine 530 capable of accommodating a sheet material 534 that is 15" wide. The first pair of drive rollers 720 and 721 are preferably knurled or roughed to provide sufficient friction for advancing the sheet material 534 therethrough while the second pair of drive rollers 730 and 731 preferably have a lower coefficient of friction than the first pair of driver rollers 720 and 721. Additionally, the second pair of drive rollers 730 and 731 have a slightly larger diameter or rotate faster which yields a faster circumferential speed than the first pair of drive rollers 720 and 721 in order to the keep the material 534 tight for proper partial cutting by the transverse cutting component 722. Because of the lower friction surface of the rollers 730 and 731, the additional tension created by the slightly faster circumferential speed of the second pair of drive rollers is not sufficient to tear or separate the resulting sheets 738 of the sheet material 534 simply by the action of the drive rollers 720 and 730. The separated sheet material 534 is then fed into the shredding device 532 for shredding and formation of the crimped strips 522 as discussed in conjunction with FIGS. 18 and 19. Although FIGS. 18–20 illustrate the conversion machine 530 as separate components, the feed assembly, shredding devise, and restriction mechanism may be integrated into a single unit as illustrated in FIG. 21. The operation of the integrated conversion machine of FIG. 21 operates in substantially the same manner as the machine of FIGS. 18–20, consequently a detailed description of FIG. 21 is omitted.

Figure 22:
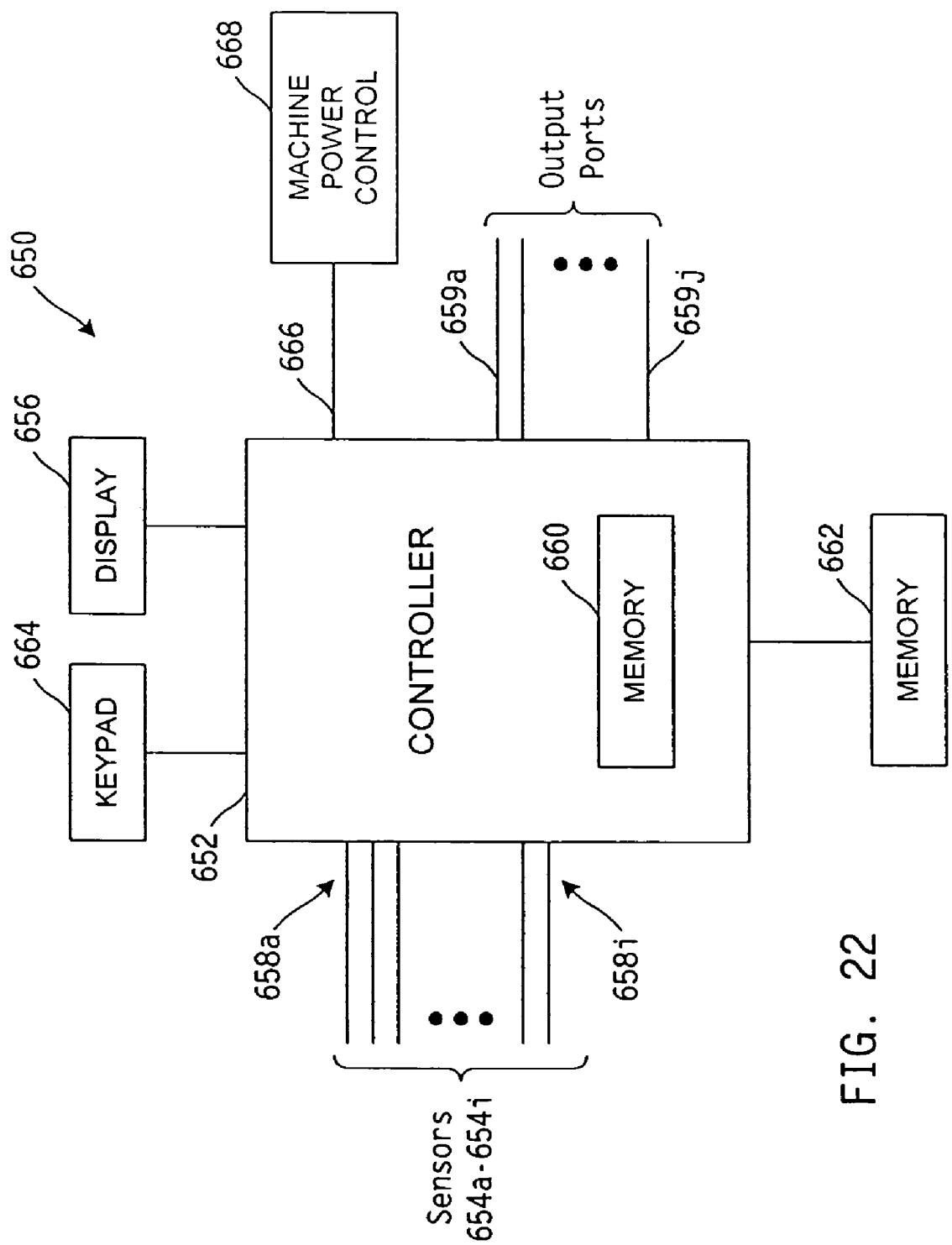
FIG. 22 is a block diagram of the controller according to an embodiment of the present invention.

Referring to FIG. 22, the conversion machine 530 of FIGS. 18–21 further includes a monitoring system 650 including a controller 652 for monitoring-the operation and status of the conversion machine 530 through a plurality of sensors 654a–654i and a display 656 for providing a visual indicia of machine operation to a user and/or a service technician. The monitoring system 650 is operable to monitor and display the machine operation in real time or alternatively may take sample data at prescribed time intervals and save the data in an internal or external memory for subsequent analysis purposes. In yet another alternative embodiment, the monitoring system 650 may monitor machine operation in real time (or at sampled intervals) and communicate the data to a remote processor via a data transmission line or communications link to provide for monitoring and diagnostic evaluation of multiple conversion machines at various site locations as will be discussed in greater detail infra in conjunction with FIG. 23.

The plurality of sensors 654a–654i monitor various, diverse operational indicia of the conversion machine 530. Each of the sensors 654a–654i monitor a particular operating characteristic or machine parameter and report the characteristic or parameter to the controller 652 via a wire or cable connection. Alternatively, however, each sensor 654a–654i may use wireless technology such as radio-frequency (RF) communication or infrared (IR) linking or other communication methodologies such as, for example, use of fiber-optic cable or coaxial cable to communicate its data to the controller 652. Various types of sensors may be utilized. For example, a bar code reader 654a may be positioned upstream from the shredding device 532 near the feeder assembly 702 of FIG. 20 to read any bar code data that may exist on a bar code label on the roll of sheet material 534. Such data may include an inventory control number, color data and perhaps even control data to be utilized for the particular roll of sheet material 534. In addition, such data may further include the paper characteristics for use in machine control operations like feed rate, moisture or chemical application or gate pressure as well as other types of control operations. Consequently, inventory control can be effectuated by identifying which colors and particular rolls of sheet material 534 are being utilized. Re-stocking inventory in response in such data may therefore be easily and efficiently accomplished.

Other sensors may also be employed with the conversion machine 530. A color sensor 654b may alternatively be used instead of, or in addition to, the bar code reader 654a. The color sensor 654b, which is commonly known in the art, is preferably located upstream of the shredding device 532 near the feeder assembly 702 of FIG. 20 and senses the color of the sheet material 534 to ensure that the desired color of sheet material 534 is, in fact, being utilized to form the crimped strips 522.

A paper quantity sensor 654c is also preferably located upstream of the shredding device 532 to monitor the accumulated amount of paper (sheet material 534) which has been converted by the conversion machine 530. The paper quantity sensor 654c may be, for example, a feeder monitor which counts the number of rotations of the drive roller 720 which the controller then preferably converts the rotation count data into a paper quantity. Alternatively, if the conversion machine 530 operates at only a single speed, the paper quantity sensor 654c may constitute a timer which monitors the on-time of the conversion machine 530 and the controller estimates the amount of paper used based upon the machine run time. Any sensing methodology by which the amount of sheet material 534 used by the conversion machine 530 is monitored is contemplated by the present invention. The information regarding the amount of paper used may then be utilized to easily and efficiently calculate use charges, etc. if the conversion machine 530 is being leased or charged based on the paper amount used. Further, the information may also be used to schedule preventative maintenance for the conversion machine 530.

Shredding device sensors 654d and 654e may also be employed within the conversion machine 530, as illustrated in FIGS. 18 and 19. The shredding motor sensor 654d monitors one or more motors which drives the transverse cutting component 722 and the cutting blades 536 and 538 to evaluate the status of the motors (not shown) and thus the status of the transverse cutting component 722 and the cutting blades 536 and 538. For example, the shredding motor sensor 654d may be one or more current sensors which monitor the load current of the shredding motors of the cutting blades 536 and 538. Any load current that rises above a predetermined current threshold ($I_{TH}$) may be indicative of a dulling or misalignment of the cutting blade 536 and 538, since an excessive amount of power is being expended by the motors.

A temperature sensor 654e also may be utilized instead of, or addition to, the shredding motor sensor 654d to monitor various aspects of the shredding device 532. The temperature sensor 654e may be a single sensor (such as, for example, a thermocouple and an A/D converter) or may include multiple sensors strategically located about the shredding device 532 (or even about the entire conversion machine 530). Thermal data may then be utilized by the controller 652 to monitor motor degradation (of either the shredding motors or feed motors), cutting blade dulling or misalignment, or variation in speed, etc. Consequently, the status and operational characteristics of the shredding device 532 can be easily and efficiently monitored by a user and/or service technician, allowing for any potential problems to be detected before a machine failure occurs. Although a shredding motor sensor 654d and temperature sensor 654e are utilized to monitor the shredding device 532, other type sensing mechanisms may also be utilized and are contemplated by the present invention.

A vibration sensor 654f is preferably utilized to monitor the vibrational characteristics or modes of the conversion machine 530. The vibration sensor 654f monitors the shredding device 532 to insure that vibrations due to machine operation do not exceed a predetermined vibration threshold or other criteria. As is well known by those skilled in the art, the vibration characteristics of various components within an operational system may provide functional or diagnostic information to a technician. For example, excessive vibration of the shredding device 532 may be indicative of a jam in the shredding device 532 or an operational problem with the cutting blades 536 and 538. Furthermore, excessive vibrations may also be indicative of an operational problem with the barrier 560 which forms the crimped strips 522. The vibration sensor 654f may be, for example, one or more accelerometers and may be positioned strategically about the shredding device 532 or at other portions of the conversion machine 530 to monitor the operation of the conversion machine 530.

A pressure sensor 654g may also be utilized within the conversion machine 530. In a preferred embodiment, the pressure sensor 654g monitors the status of the gate 570 which constitutes the barrier 560 by which the crimped strips 522 are initially formed. Once a particular pressure threshold is reached, the gate 570 is forced into a partial or complete open position to thereby allow the crimped strips 522 to travel toward the receiving bin 616. Failure of the gate 570 to open at the prescribed pressure level may result in the crimped strips 522 within the confined areas 562 causing a jam at the shredding device 532. Consequently, the pressure sensor 654g may monitor the force being exerted against the gate 570. If the pressure needed to raise the gate 570 exceeds a predetermined threshold, the pressure sensor 654g may communicate such a status to the controller 652. The pressure sensor 654g may measure the force exerted against the gate 570 by, for example, measuring the force being exerted at the hinge of the gate 570, such a measurement being, for example, a torque measurement. Other methods by which the pressure sensor 654g may monitor the status of the gate or the pressure at the cutting blades 536 and 538 are also contemplated by the present invention. For example, a position sensor in conjunction with a potentiometer or a linear variable differential transducer (LVDT) may be utilized.

Another sensor that may be employed in the monitoring system 650 is a shear force sensor 654h which senses or measures the shear force being exerted by the transverse cutting blade 622 before the crimped strips 522 exit the conversion machine 530 and enter the receiving bin 616. As stated earlier, the transverse cutting blade 622 is operable to cut the crimped strips 522 into selectable lengths, thereby resulting in sheared fragments or segments as illustrated in FIG. 17. It is desirable, therefore, for the transverse cutting blade 622 to cut the crimped strips 522 with a minimal amount of force so as to ensure cutting of the front portion 524 and back portion 526 of the crimped strips 522 to thereby form the segments 523. Consequently, the shear force sensor 654h is operable to monitor the shear force being exerted by the transverse cutting blade 622 against the crimped strips 522. If the shear force exerted by the transverse cutting blade 522 does not meet or exceed a predetermined force threshold, the shear force sensor 654h provides an indication of such a operation characteristic to the controller 652. Alternatively, the sensor 654h may additionally communicate the shear force data to the controller 652 for continuous monitoring.

Lastly, the monitoring system 650 may include a container sensor 654i. The container sensor 654i may entail a bar code reader to thereby read a bar code label on the container 616. The bar code label may contain information regarding the customer identity and/or the container volume. Consequently, the container sensor 654i can relay such information to the controller 652 for use in recording the usage of various customers for marketing and/or control purposes. In addition, the container volume data may be utilized to evaluate whether sufficient amounts of the crimped strips 522 are being used to fill the container bin 616 having a known volume for quality control purposes. The container sensor 654i may also include a weight sensor to correlate the volume of the strips 522 placed in the bin 616 with other data collected from other sensors 654a–654h to ensure that the sensors are accurately measuring their respective operation characteristics or parameters.

Preferably, the controller 652 illustrated in FIGS. 18, 19, 22 and 23 is a universal type programmable controller such as a programmable logic controller (PLC), the configuration and programmability of which is well known to those skilled in the art. The universal type controller is preferred because it allows for a single type of controller configuration to be adaptable to various machine variations. Further, a universal controller allows for reduced set-up time, reduces assembly cost, and makes maintenance easier and less expensive. Lastly, universal controllers are beneficial since training of the repair technician is minimized and since an inventory of universal controllers may be easily maintained. Although a universal controller is preferred, any custom-type controller may also be utilized and is contemplated as falling within the scope of the present invention. For example, any 8-bit, 16-bit or 32-bit custom, programmable I/O controller may be utilized on conjunction with the present invention.

An exemplary universal controller 652 is illustrated in FIG. 22 and includes a plurality of input ports 658a–658i devoted to receiving data from the various sensors 654a–654i. Preferably, the data received from each of the sensors 654a–654i is digital, single or multi-bit digital data. Alternatively, however, the controller 652 may incorporate an A/D converter internally or external to the input ports 658a–658i to convert received analog signals into single or multi-bit digital data. In addition, while the controller 652 is illustrated as a single, integrated device, it is noted that the controller 652 may be embodied as a plurality of controllers that may each be adapted for a particular function.

The controller 652 also includes a plurality of output ports 659a–659j (wherein j=1, 2 . . . n) to provide control functions for the conversion machine 530. For example, the controller 652, via the output ports 659a–659j, is operable to control the main power, interlocks, operator panel switches and indicators, etc. Consequently, the controller 652 is operable to restrict the order of start up (by, for example, ensuring that the shredding device is running before the sheet rollers are activated). Since the controller 652 provides machine control functionality, the controller 652 has a substantial amount of monitoring-type information without data from the sensors 654a–654i. For example, the controller 652 has machine status information that may be evaluated for diagnostic purposes such as the on/off/idle status of the sheet motors and shredder motors, the accumulated run time of each component, the electric safety interlocks on the operator access panels and the status of safety circuits such as, for example, the emergency stop circuit.

The controller 652 provides such control functions via its internal programming. For example, since many of the control functions are on/off type control functions, a 1-bit digital signal may comprise the control output signal. For variable type output control functionality, one or more multi-bit control signals may be utilized (for example, to provide variable feed roller circumferential control speed) as will be appreciated by those skilled in the art.

The universal controller 652 receives the data from the sensors 654a–654i at the sensor input ports 658a–658i and stores, processes and/or displays the data and its internal control data on the display 656 which is preferably local to the monitored conversion machine 530. The controller 652, in response to the data at the input ports 658a–658i and its internal programming, generates a display output via a display driver (not shown) to provide a visual indicia of the machine status on the display 656. Alternatively, or in addition to the display, the controller 652 stores the input data in an internal memory 660 and/or in an external memory 662. For example, if the bar code reader 654a reads a bar code on a roll of sheet material 534 and determines that a roll #10 of gray paper is being used, the controller 652 receives that data as a multi-bit piece of digital data, wherein, for example, the first three bits are a color code and the next three bits constitute the particular roll number for that particular color. The controller 652 receives the multi-bit data, determines the color and roll number (via its internal programming, as is well known by those skilled in the art) and displays the data on the display 656 and/or stores the data in the memory 660 or 662 for later inventory analysis.

The paper quantity sensor 654c monitors the total amount of paper used by the machine 530 or alternatively the amount of paper used on the present roll of sheet material 534 or both. Alternatively, the sensor 654c may monitor both pieces of data or separate sensors may be utilized for such a function. Preferably, the sensor 654c monitors the number of rotations of a feed roller and calculates the amount of paper by multiplying the rotation count by the known circumference of the drive roller. This data is then fed to the controller 652 (or alternatively merely the rotation count is sent to the controller 652 and the controller makes the calculation via its internal programming) and the amount of paper used is then displayed on the display 656 and/or downloaded into the memory 660 or 662, preferably at predetermined time intervals. These time intervals may be, for example, every five minutes, every thirty minutes, each hour, or each day. The controller 652 may also provide a sheet material roll status indication to the user via the display 656 by generating a warning indication or low paper indication on the display 656 when the controller 652 determines that the amount of the sheet material 534 on the roll is almost finished.

Various other diagnostic functions are performed by the controller 652 in conjunction with the sensors 654a–654i. In each of these monitoring functions, the sensors 654a–654i either convert the sensed condition into digital data internally or send the raw data to the controller 652 for subsequent processing. Preferably, each sensor 654a–654i converts its data to digital data to prevent errors due to line loss (via, for example, analog-to-digital converters), and the controller 652 performs any subsequent processing to minimize the complexity and cost of each sensor 654a–654i. Alternatively, however, the controller 652 may include A/D conversion capability as discussed earlier to further simplify each of the sensors 654a–654i.

With several of the monitoring functions such as those provided by, for example, the vibration sensor 654f and shear force sensor 654h, a warning is preferably provided to the user visually via the display and/or audibly via an alarm when the monitored characteristic(s) exceeds or falls below a predetermined parameter threshold. For example, the vibration sensor 654f senses the vibration modes of the conversion machine 530 at one or more locations. If the conversion machine 530 exceeds a predetermined vibration level at one or more locations, the controller 652 records the vibration level data in its memory 660 (or the external memory 662) and also compares the vibration data to a predetermined programmed threshold. If the vibration data exceeds the threshold, the controller 652 generates an error or warning signal to the user so that maintenance of the machine 530 may be performed before a machine failure occurs. Preferably, the controller 652 generates a visual warning via the display 656 coupled with an audible warning to focus the user's attention on the system condition.

The controller 652 preferably provides such functionality in the following manner. The controller 652 receives the vibration data (or, alternatively, shear force data, thermal data, etc.) and compares it to the predetermined threshold. Preferably, the threshold is simply subtracted from the vibration data and if the result is positive, a warning is generated (indicating the vibration data exceeds the threshold). Alternatively, the vibration data can be converted to a corresponding voltage via a look-up table and compared to a voltage corresponding to the threshold via a comparator circuit as is well known by those skilled in the art. The controller 652 preferably maintains its status if no warning is needed and may, if desired, display the present vibration data on the display 656. Alternatively, the vibration data may be stored in the memory 660 and displayed on the display 656 only when prompted by the user via an I/O peripheral (such as a keypad 664).

In the preferred embodiment of the present invention, the monitoring system 650 of the conversion machine 530 simply displays the status of the various system characteristics as measured by the sensors 654a–654i. Alternatively, however, the controller 652 may also control the operation of the conversion machine 530 via a machine disable output 666 coupled to a machine power control 668. If, for example, the controller 652 received data from one of the sensors 654a–654i that the controller 652 determined (via its internal programming) constitutes a dangerous condition that could cause machine damage, etc., the controller 652 may trigger the machine disable output 666 to turn off the conversion machine 530 via the machine power control 668 and relay the condition to the user via the display 656. In this manner the monitoring system 650 collectively provides machine conversion control to prevent machine damage or failure.

In the previous embodiment of the present invention, the monitoring system 650 monitored the status and operating characteristics of the conversion machine 530 and stored and displayed the results locally in the memory 660 or 662 and the display 656. According to another embodiment of the present invention, a monitoring system 716 is operable to monitor the status and operating characteristics of the conversion machine 530 of FIGS. 18–22 and transmit the data to another location for remote monitoring and diagnostic analysis, as illustrated in FIG. 23.

Figure 23:
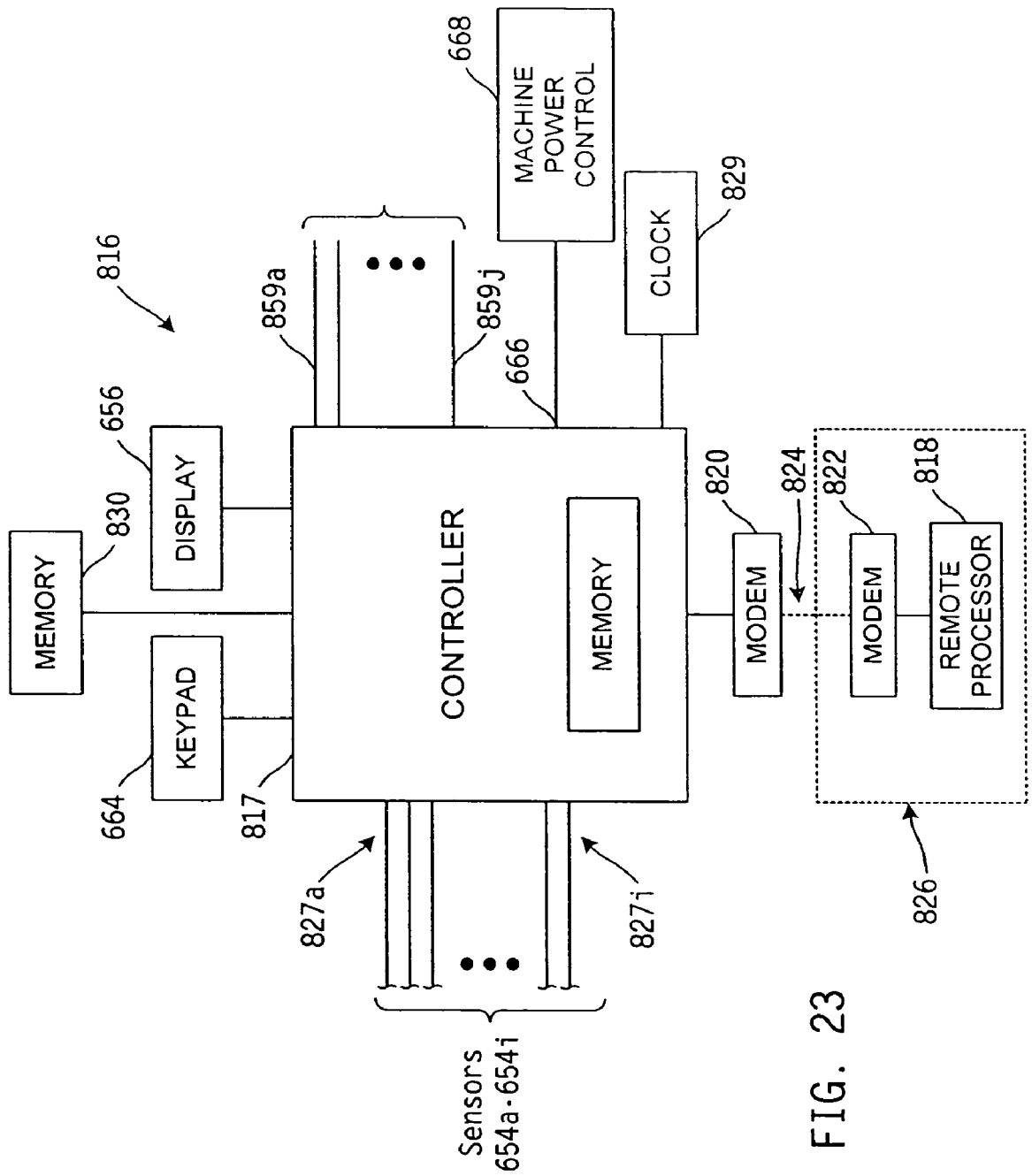
FIG. 23 is a block diagram of the controller coupled to a remote processor according to another embodiment of the present invention.

With reference to FIG. 23, there is shown a monitoring system 816 having a controller 817 local to one or more conversion machines 530 for communication with a remote processor 818, such as a remote terminal or personal computer, through a pair of modems 820, 822, respectively, over a transmission line or communication link 824. (The remote processor 818 and corresponding modem 822 are designated as separate from the controller 817 by the dashed box 826 indicating a remote location, such as a service center.) The controller 817 is generally equivalent to the controller 652 described above relative to FIGS. 18 through 22. As is discussed above, the controller 817 receives a number of inputs 827*a*–827*i* corresponding to events detected by the sensors 654*a*–654*i* shown in the FIGS. 18 though 22. The characteristics and status sensed by the sensors 654*a*–654*i* include the type and quantity of paper being used, the container being filled, etc. and further includes detection of machine errors, such as jams in the feeder or cutting assemblies 702 and 532, excessive vibrational modes due to misalignments, etc., the shear force exerted by the cutting mechanism 622 and various other types of information. In addition, the controller 817 has one or more output ports 859*a*–859*i* to provide machine control functionality.

The controller 817 may also be provided with a real-time clock 829 to report a number of time events, for example, the total time the machine is on, the total time the machine is active as opposed to the time devoted to maintenance and the total time the feed motor or cut motor is running. The real-time clock 829 can also be used to time and date stamp occurrences of faults or warning conditions detected by the controller 817. Although the clock 829 is only illustrated in conjunction with FIG. 23, the clock 829 is also equally applicable to the monitoring system 650 of FIG. 22.

All information received by the controller 817 may be stored in an internal memory 829 or an external, non-volatile memory 830 for later retrieval. When desired, the information stored in the memory 829 or 830 may be accessed from the remote location 826 through communication between the remote processor 818 and the controller 817 over the modems 820 and 822. The modems 820 and 822 may be conventional, commercially available modems communicating over a telephone link 824 through conventional communications protocols as would be appreciated by those skilled in the art.

The information stored in the memory 829 or 830 of the controller 817 may be automatically downloaded to the remote processor 818 at pre-planned time intervals, for example, at the end of a day, or the end of a week. Alternatively, a service person at the remote location 826 can instruct the controller 817 through the connection with the remote processor 818 via the modems 820 and 822 to download the information stored in the memory 829 or 830 to the remote processor 818 as desired. Further, the connection between the remote processor 818 and the controller 817 allows a service person to view in real-time or near real-time the status of machine 530 corresponding to the sensors 654*a*–654*i* and other inputs described above, while the machine 530 is running. This enables the service person to remotely diagnose errors in the conversion machine 530 since the service person is able to look at sensor information from the machine 530 as an error is occurring in real-time. The information downloaded to the remote processor 818 from the memory 820 or 830 can also be used to schedule maintenance for the machine 530 and to perform billing functions in instances where a customer is charged for use of the machine 530 based on its operating time, on the amount of paper fed through the machine 530, or on the number of sheared strips 523 produced by the machine 530. The information downloaded to the remote processor 818 can further be used to effectuate inventory control by identifying what types and quantities of paper are being used so that paper inventories can be automatically replenished in a timely manner.

In instances where a service person is at the site of the conversion machine 530, it is also possible to access the memory 820 or 830 through the same port provided for communication with the remote processor 818. In such a case, instead of the modem 820 being connected to the controller 817, a personal computer or other terminal may be connected to the controller 817 for access and downloading of the information stored in the memory 829 or 830. Alternatively, the service person may view the operational status of the machine 530 via the display 656 and the key pad 664.

The controller 817, which is resident in the conversion machine 530 or local to the conversion machine 530, and the remote processor 818 can also function as a real-time diagnostics system for the conversion machine 530 by utilizing the modems 820 and 822 and the transmission line 824 to provide real-time or near real-time communication between the controller 817 and the remote processor 818. Near real-time communication allows an operator at a central location, such as a servicing or distribution location 826, to obtain operational information on the performance of one or more conversion machines 530 as the machines are operating. The machine information may be used as a diagnostic measure to determine if the machine 530 is functioning properly or is in need of preventive maintenance. For example, if the remote processor 818 determines, based on information received from the controller 817 in real-time, that a motor runs excessively long or drawn excessive current, the remote processor 818 can infer that the motor is excessively worn and schedule a replacement before the motor fails. The machine information may also be used to diagnose or correct machine problems, as well as to determine that the machine 530 is being operated correctly by an operator.

Some types of information which the remote processor 818 can receive from the machine controller 817 includes the status of any machine sensor 654*a*–654*i*. The controller 817 may also provide information to the remote processor 817 relating to control commands or instructions produced by the controller 817, including the machine output disable port 660. The remote processor 818 can also access, through the controller 817, any of the internal or external memory locations 829 or 830 to provide an in depth view of the functioning of the machine 530 and to analyze whether the controller 817 is receiving and processing data correctly.

Aside from requesting information from the controller 817, the remote processor 818 can also provide input to the controller 817 to instruct the controller 817 to execute a predetermined test (as dictated by the internal programming of the controller 817) or the remote processor 818 may change threshold values in the memory 829 or 830 of the controller 817 to monitor the function of the conversion machine 530 in accordance with desired inputs. Further, the internal programming control routines may be modified from the remote site 826, thereby allowing software monitoring, control and diagnostic upgrades to be easily implemented globally to multiple machines 530 from one central location.

Consequently, a skilled servicing technician at a central location can follow the operation of a remote conversion machine 530 in real-time or near real-time as the machine 530 is operating to allow the service technician to readily ascertain the functioning of the machine 530 and to correct errors. In addition, the servicing technician can recommend different operating guidelines to an operator or a technician working with the machine 530 in diagnosing and correcting problems in the machine 530. Furthermore, the technician at the central location can monitor the inventories at the remote site to ensure that sufficient quantities of the various colors of paper are available before they are actually required.

Although the monitoring systems 650 and 816 of the present invention have been disclosed in conjunction with the conversion machine 530 of FIGS. 18–23, it should be understood that the present invention is equally applicable to various, diverse types of packaging material conversion machine and packaging material dispensing machines. For example, the monitoring systems 650 and 816 are equally applicable to a packaging material conversion machine that produces various types of dunnage such as cushion pads, styrofoam peanuts, plastic wrapping materials, etc. In addition to being applicable to machines that produce such dunnage, the present invention is also contemplated as applying to various types of apparatus that dispense such dunnage into containers and/or apply such dunnage to various objects for packing.

Although the invention has been shown and described with respect to certain preferred embodiments, it is obvious that equivalent alterations and modifications will occur to others skilled in the art upon the reading and understanding of this specification and the annexed drawings. In particular regard to the various functions performed by the above described components (assemblies, devices, sensors, circuits, etc), the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of the invention may have been disclosed with respect to only one of several embodiments, such feature may be combined with one or more other features of the other embodiments as may be desired and advantageous for any given or particular application.

What is claimed is:

1. A method of providing dunnage to a container for packing an object that is in the container, the method comprising the steps of:

measuring the void volume of the container within which the object is placed using a probe;

determining the void volume from measurement information output from the probe;

determining an amount of dunnage for packing the object in the container based on the void volume; and dispensing the determined amount of dunnage from a supply of dunnage for packing the object in the container.

2. A method as set forth in claim 1, wherein the dispensing step includes controlling a conversion machine to convert sheet stock material into the determined amount of dunnage for the container.

3. A method as set forth in claim 2, further comprising providing a cushioning conversion machine having a conversion assembly which converts the sheet stock material into a three-dimensional strip of dunnage, the conversion assembly including a forming assembly which forms the sheet stock material into a strip of dunnage and a feed assembly which feeds the stock material through the forming assembly, a stock supply assembly, positioned upstream of the conversion assembly which supplies the stock material to the conversion assembly; a cutting assembly, positioned downstream of the conversion assembly, which cuts a section of the strip of dunnage; and controlling the feed assembly and the cutting assembly to produce the determined amount of dunnage.

* * * * *